United States Patent
Ryu et al.

(10) Patent No.: US 10,454,863 B2
(45) Date of Patent: Oct. 22, 2019

(54) DATA PROCESSING DEVICE AND DATA PROCESSING METHOD BASED ON USER EMOTION ICON ACTIVITY

(71) Applicant: Samsung Electronics Co., Ltd., Suwon-si, Gyeonggi-do (KR)

(72) Inventors: Je-Hyok Ryu, Suwon-si (KR); Shin-Il Kang, Suwon-si (KR); Young-Cheon Ko, Pocheon-si (KR); Jung-Min Son, Suwon-si (KR); Seung-Yeol Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 14/703,238

(22) Filed: May 4, 2015

(65) Prior Publication Data

US 2015/0319119 A1    Nov. 5, 2015

(30) Foreign Application Priority Data

May 2, 2014 (KR) .................. 10-2014-0053505

(51) Int. Cl.
   *H04L 12/58* (2006.01)
   *G06F 3/0484* (2013.01)
   *G06Q 30/02* (2012.01)

(52) U.S. Cl.
   CPC .......... *H04L 51/10* (2013.01); *G06F 3/04842* (2013.01); *G06Q 30/0241* (2013.01); *G06Q 30/0251* (2013.01); *G06Q 30/0261* (2013.01); *H04L 51/04* (2013.01)

(58) Field of Classification Search
   CPC .......... G06Q 30/0251; G06Q 30/0241; G06Q 30/0261; H04L 51/10; H04L 51/04; G06F 3/04842
   See application file for complete search history.

(56) References Cited

U.S. PATENT DOCUMENTS

| 7,080,139 B1 * | 7/2006 | Briggs | G06Q 30/02 707/999.003 |
|---|---|---|---|
| 7,640,304 B1 * | 12/2009 | Goldscheider | G06Q 10/10 709/204 |
| 8,170,872 B2 * | 5/2012 | Lyle | H04L 51/04 379/88.17 |
| 9,460,083 B2 * | 10/2016 | Fink | G06F 17/2785 |
| 2002/0062368 A1 * | 5/2002 | Holtzman | G06F 21/31 709/224 |
| 2006/0080161 A1 * | 4/2006 | Arnett | G06F 21/31 705/7.31 |

(Continued)

FOREIGN PATENT DOCUMENTS

WO   WO-2013180343 A1 * 12/2013  ............. G06Q 10/10

*Primary Examiner* — Amy M Levy
(74) *Attorney, Agent, or Firm* — Jefferson IP Law, LLP

(57) ABSTRACT

A data processing device and a data processing method are provided. The data processing device includes a collection storage unit configured to collect and store emotion icon log data for an emotion icon activity of a user with respect to one or more services and an analysis processing unit configured to analyze the emotion icon activity of the user by using the emotion icon log data, and to provide, to a service server, a result obtained by analyzing the emotion icon activity of the user, to allow the service server to apply the result obtained by analyzing the emotion icon activity of the user, to the services.

25 Claims, 19 Drawing Sheets

(56) References Cited

U.S. PATENT DOCUMENTS

| | | | |
|---|---|---|---|
| 2006/0184572 A1* | 8/2006 | Meek | G06F 17/30536 |
| 2007/0200713 A1* | 8/2007 | Weber | H04L 67/24 340/573.1 |
| 2008/0312949 A1* | 12/2008 | Nagasaka | G06Q 30/02 705/1.1 |
| 2009/0193344 A1* | 7/2009 | Smyers | G06F 3/011 715/753 |
| 2009/0233632 A1* | 9/2009 | Yamamoto | H04L 51/063 455/466 |
| 2009/0307263 A1* | 12/2009 | Skibiski | G06Q 30/02 |
| 2009/0307629 A1* | 12/2009 | Horiuchi | G06F 3/04817 715/810 |
| 2010/0030722 A1* | 2/2010 | Goodson | G06Q 30/02 706/54 |
| 2010/0057743 A1* | 3/2010 | Pierce | G06F 17/30699 707/E17.134 |
| 2010/0076968 A1* | 3/2010 | Boyns | H04W 4/21 707/732 |
| 2010/0088616 A1* | 4/2010 | Park | G06F 3/0236 715/762 |
| 2010/0174813 A1* | 7/2010 | Hildreth | G06F 17/30943 709/224 |
| 2010/0178939 A1* | 7/2010 | Kang | H04W 4/02 455/456.3 |
| 2010/0179991 A1* | 7/2010 | Lorch | H04M 1/7253 709/206 |
| 2010/0306249 A1* | 12/2010 | Hill | G06F 17/30867 707/769 |
| 2011/0010366 A1* | 1/2011 | Varshavsky | G06F 17/30864 707/732 |
| 2011/0179385 A1* | 7/2011 | Li | G06F 17/3082 715/810 |
| 2011/0264741 A1* | 10/2011 | Ganetakos | G06Q 30/02 709/204 |
| 2012/0049998 A1* | 3/2012 | Lim | H04M 1/72569 340/1.1 |
| 2012/0095976 A1* | 4/2012 | Hebenthal | G06F 17/30867 707/706 |
| 2012/0124083 A1* | 5/2012 | Yoo | G06Q 10/063112 707/769 |
| 2012/0166536 A1* | 6/2012 | Song | G06Q 50/01 709/204 |
| 2012/0272160 A1* | 10/2012 | Spivack | G06Q 10/10 715/752 |
| 2013/0024464 A1* | 1/2013 | Berner | G06F 17/30864 707/749 |
| 2013/0024781 A1 | 1/2013 | Douillet et al. | |
| 2013/0097246 A1* | 4/2013 | Zifroni | G06Q 50/01 709/204 |
| 2013/0103766 A1 | 4/2013 | Gupta | |
| 2013/0166725 A1 | 6/2013 | Liyanage et al. | |
| 2013/0204664 A1* | 8/2013 | Romagnolo | G06Q 30/0203 705/7.32 |
| 2013/0232159 A1* | 9/2013 | Daya | G06Q 50/01 707/758 |
| 2013/0247078 A1 | 9/2013 | Nikankin et al. | |
| 2013/0346515 A1* | 12/2013 | DeLuca | G06Q 50/01 709/206 |
| 2014/0004489 A1* | 1/2014 | Kim | G09B 19/00 434/236 |
| 2014/0040068 A1* | 2/2014 | Mohan | G06Q 30/02 705/26.7 |
| 2014/0108308 A1* | 4/2014 | Stout | G06N 3/08 706/12 |
| 2014/0109002 A1* | 4/2014 | Kimball | G06F 3/04842 715/800 |
| 2014/0136534 A1* | 5/2014 | Lee | G06Q 50/01 707/732 |
| 2014/0143682 A1* | 5/2014 | Druck | G06Q 10/107 715/752 |
| 2014/0189536 A1* | 7/2014 | Lange | H04L 67/22 715/753 |
| 2014/0201125 A1* | 7/2014 | Moeinifar | G06Q 50/182 706/47 |
| 2014/0278786 A1* | 9/2014 | Liu-Qiu-Yan | G06Q 30/0201 705/7.32 |
| 2014/0280553 A1* | 9/2014 | Hernandez | H04L 67/22 709/204 |
| 2014/0298364 A1* | 10/2014 | Stepanov | H04N 21/25 725/10 |
| 2015/0061825 A1* | 3/2015 | Suzuki | H04W 4/206 340/5.52 |
| 2015/0127174 A1* | 5/2015 | Quam | F24F 11/63 700/276 |
| 2015/0127577 A1* | 5/2015 | Farronato | G06Q 30/0201 705/347 |
| 2015/0134235 A1* | 5/2015 | Shan | G01C 21/26 701/409 |
| 2015/0142677 A1* | 5/2015 | Patman | G06Q 30/016 705/304 |
| 2015/0286371 A1* | 10/2015 | Degani | G06F 17/274 705/14.64 |
| 2015/0334075 A1* | 11/2015 | Wang | G07C 13/00 715/752 |
| 2015/0339009 A1* | 11/2015 | Seo | G06F 3/0482 715/739 |
| 2015/0339396 A1* | 11/2015 | Ayers | G09B 5/067 707/734 |
| 2016/0048492 A1* | 2/2016 | Barrett | G06F 17/30867 715/233 |

* cited by examiner

| Good | ☺ |
| Hate | ☹ |
| Surprise | 😮 |
| Sad | (ㅠㅠ) |
| Envy | ✧ |

| GOOD IMAGE FOR VIEWING | Love + See | 👀 |
| LOVELY SOUND FOR LISTENING | Love + Hear | 👂 |
| CONTENTS BY WHICH HUMANITY IS FELT | Love + humanity | 🧍 |

| | | | | FIRST SERVICE | SECOND SERVICE | THIRD SERVICE | ... |
|---|---|---|---|---|---|---|---|
| | | | J | FIRST SERVICE | SECOND SERVICE | THIRD SERVICE | ... |
| | | T | J | FIRST SERVICE | SECOND SERVICE | THIRD SERVICE | ... |
| | A | T | J | FIRST SERVICE | SECOND SERVICE | THIRD SERVICE | ... |
| J | A | T | J | FIRST SERVICE | SECOND SERVICE | THIRD SERVICE | ... |
| P | J | A | T | John | 190 | 432 | 0 | ... |
| Envy : | P | J | A | Thomas | 201 | 0 | 530 | ... |
| Sad : | | P | J | Anna | 309 | 0 | 0 | ... |
| Surprise : | | | P | James | 478 | 120 | 320 | ... |
| Hate : | | | | Peter | 569 | 0 | 0 | ... |
| Good | | | | : | : | : | : | : |

FIG.6

```
A, 1, 88, Image1, f1
B, 2, 93, Image2, f2
C, 1, 12, Image3, f1
           :
```

FIG.7

|  | FIRST SERVICE | SECOND SERVICE | THIRD SERVICE | ... |
|---|---|---|---|---|
| John | 190 | 432 | 0 | ... |
| Thomas | 201 | 0 | 530 | ... |
| Anna | 309 | 0 | 0 | ... |
| James | 478 | 120 | 320 | ... |
| Peter | 569 | 0 | 0 | ... |
| ⋮ | ⋮ | ⋮ | ⋮ |  |

FIG.14A

|  | FIRST SERVICE | SECOND SERVICE | THIRD SERVICE | ... |
|---|---|---|---|---|
| John | 190 | 432 | 0 | ... |
| Thomas | 201 | 0 | 530 | ... |
| Anna | 309 | 0 | 0 | ... |
| James | 478 | 120 | 320 | ... |
| Peter | 569 | 0 | 0 | ... |
| ⋮ | ⋮ | ⋮ | ⋮ |  |

FIG.14B

|  | Rank 1 | Rank 2 | ... |
|---|---|---|---|
| John | THIRD SERVICE | | |
| Thomas | SECOND SERVICE | | |
| Anna | THIRD SERVICE | SECOND SERVICE | |
| James | | | |
| Peter | THIRD SERVICE | SECOND SERVICE | |
| ⋮ | ⋮ | ⋮ | |

DATA PROCESSING DEVICE AND DATA PROCESSING METHOD BASED ON USER EMOTION ICON ACTIVITY

CROSS-REFERENCE TO RELATED APPLICATION(S)

This application claims the benefit under 35 U.S.C. § 119(a) of a Korean patent application filed on May 2, 2014 in the Korean Intellectual Property Office and assigned Serial number 10-2014-0053505, the entire disclosure of which is hereby incorporated by reference.

TECHNICAL FIELD

The present disclosure relates to a data processing device and a data processing method based on a user emotion activity.

BACKGROUND

With the development of mobile communication, users can use various services anytime and anywhere through a mobile device as well as a Personal Computer (PC). For example, the users actively communicate with others through the mobile device by using various services. The users may use a message service to send/receive a message, or may use a contents service to receive various types of contents and to transfer/receive an opinion about the contents.

Recently, an interaction through communication may be performed not only by demographic information or personal information, but also by active expression through which the users share preferred contents and their feelings about the contents with each other. For example, the user may express the feeling about the contents in written words, and may communicate with others through an emotion activity which expresses their feelings about the content through an emotion icon when the emotion icon is provided. Such a user emotion activity is shared with other users so that the users can emotionally communicate with each other.

The above information is presented as background information only to assist with an understanding of the present disclosure. No determination has been made, and no assertion is made, as to whether any of the above might be applicable as prior art with regard to the present disclosure.

SUMMARY

Although a user emotion activity according to the related art is mainly used for sharing feelings with users and for matching users who feel the same emotion, a technology has not been provided which analyzes a user emotion activity in various schemes to apply the analyzed result to a service.

Aspects of the present disclosure are to address at least the above-mentioned problems and/or disadvantages and to provide at least the advantages described below. Accordingly, an aspect of the present disclosure is to provide a data processing device and a data processing method, based on a user emotion activity, which can analyze the user emotion activity in various schemes to apply the analyzed result to a service.

Another aspect of the present disclosure is to provide a data processing device and a data processing method, based on a user emotion activity, which can provide an emotion icon capable of expressing a user's emotion about contents, and can analyze a use record of emotion icons of various users to apply the analyzed result to a service.

Another aspect of the present disclosure is to provide a data processing device and a data processing method, based on a user emotion activity, which can analyze a relationship between users, a relationship between a user and contents, a relationship between a user and a service, a relationship between a user and a location, or a community and a user influential in the community by using log data for emotion icon activities of various users, and can apply the analyzed result to a service.

In accordance with an aspect of the present disclosure, a data processing device is provided. The data processing device includes a collection storage unit that collects and stores emotion icon log data for an emotion icon activity of a user with respect to one or more services and an analysis processing unit that analyzes the emotion icon activity of the user by using the emotion icon log data, and provides, to a service server, the result obtained by analyzing the emotion icon activity of the user, to allow the service server to apply the result obtained by analyzing the emotion icon activity of the user, to the services.

In accordance with another aspect of the present disclosure, a data processing method is provided. The data processing method includes collecting and storing emotion icon log data for an emotion icon activity of a user with respect to one or more services and analyzing the emotion icon activity of the user by using the emotion icon log data, and providing, to a service server, the result obtained by analyzing the emotion icon activity of the user, to allow the service server to apply the result obtained by analyzing the emotion icon activity of the user, to a service.

An aspect of the present disclosure is to provide a service in which an emotion activity is reflected since a user emotion activity can be analyzed in various schemes so that the analyzed result can be applied to the service.

Another aspect of the present disclosure is to provide a more enhanced service since a relationship between users, a relationship between a user and contents, a relationship between a user and a service, a relationship between a user and a location, a community, and a user influential in the community can be analyzed by using log data for an emotion icon activity of various users and the analyzed result can be applied to the service.

Another aspect of the present disclosure is to recommend an emotion friend by analyzing a relationship between users by using log data for emotion icon activities of users and by deducing a user having similar feelings based on the analyzed relationship between the users.

Another aspect of the present disclosure is to recommend an emotion content by analyzing a relationship between a user and contents by using log data for emotion icon activities of users and by deducing the contents having similar feelings based on the analyzed relationship between the user and the contents.

Another aspect of the present disclosure is to recommend an emotion service by analyzing a relationship between a user and a service by using log data for emotion icon activities of users and by deducing the service having similar feelings based on the analyzed relationship between the user and the contents.

Another aspect of the present disclosure is to provide a content having similar feelings by analyzing a relation between a user and a location where contents are generated, by using log data for emotion icon activities of users and by deducing the location having similar emotion based on the analyzed relationship between the user and the location.

Another aspect of the present disclosure is to improve efficiencies of advertisement exposure and an advertisement click by analyzing a community and a user influential in the community by using log data for emotion icon activities of users and by providing an advertisement to a page of the influential user.

Another aspect of the present disclosure is to allow communities to recommend a service to each other, by deducing a hub between the communities by using log data for emotion icon activities of users and by deducing an enlarged community based on the hub, and can increase the number of service subscribers through the recommendation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a view for describing an analysis of a relationship between a user and a service in a second mode network analysis module according to an embodiment of the present disclosure;

FIG. 7 is a view for describing an analysis of a community and a user influential in the community in a community analysis module and an influence analysis module according to an embodiment of the present disclosure;

FIGS. 14A, 14B, 14C, and 14D illustrate examples of a service to which the analysis of the relationship between a user and contents is applied according to an embodiment of the present disclosure;

Throughout the drawings, it should be noted that like reference numbers are used to depict the same or similar elements, features, and structures.

DETAILED DESCRIPTION

Figures 1A, 1B, 2:
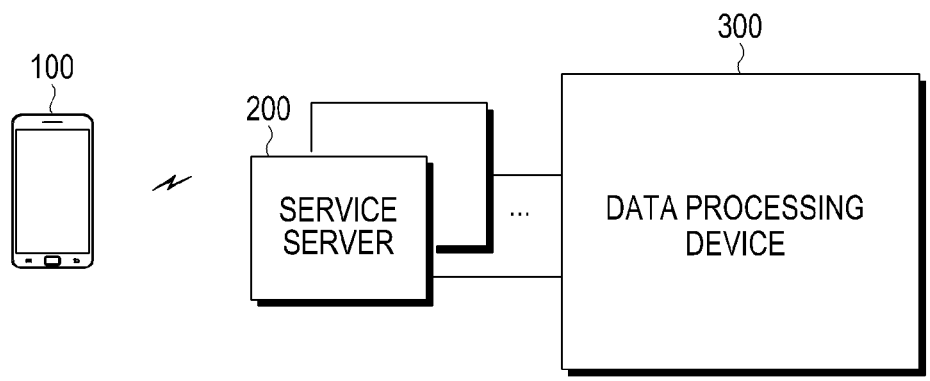
FIGS. 1A and 1B are views for describing emotion icons according to various embodiments of the present disclosure.
FIG. 2 is a schematic conceptual view for describing a system for providing a user emotion activity based service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "include" or "may include" refers to existence of a corresponding function, operation, or element, and does not limit one or more additional functions, operations, or elements. Further, it should be understood that the terms "include" or "have" in various embodiments of the present disclosure refer to the presence of features, numbers, steps, operations, elements or components or a combination thereof, which are described in the specification, and do not rule out the presence or the addition of features, numbers, steps, operations, elements or components or a combination thereof.

The expression such as "or" or the like in various embodiments of the present disclosure include any and all of the combinations of words disclosed together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, without departing from the scope of the present disclosure, a first structural element may be named a second structural named. Similarly, the second structural element also may be named the first structural element.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween.

Terms used in various embodiments of the present disclosure are intended not to restrict various embodiments of the present disclosure but to explain specific embodiments. Singular forms are intended to include plural forms unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In accordance with various embodiments of the present disclosure, an emotion icon may be provided in various types of services provided through an electronic device. In accordance with an embodiment, the various types of services may include a social network service, a contents service, etc. which can be provided through the electronic device. A user can perform an emotion icon activity for various targets, such as a user, contents, a service, etc., during use of the services through the electronic device. In accordance with an embodiment, the user may express an emotion on a post of another user by selecting an emotion icon during use of the social network service through the electronic device, or may express an emotion on contents by selecting an emotion icon during use of the contents service through the electronic device. In addition, the user may express an emotion by using emotion icons for various types of targets during use of various types of services.

FIGS. 1A and 1B are views for describing emotion icons according to various embodiments of the present disclosure.

Referring to FIG. 1A, the emotion icons may correspond to icons capable of showing feelings for targets which are to express feelings thereof. In accordance with an embodiment, the emotion icons may be icons capable of showing feelings which correspond to "good", "hate", "surprise", "sad", and "envy". Referring to FIG. 1B, emotion icons may correspond to icons capable of showing types and feelings for targets which are to express feelings thereof. In accordance with an embodiment, the emotion icons may correspond to icons capable of showing types and feelings for targets which are to express feelings thereof, such as icons of a good image for viewing (Love+See), a lovely sound for listening (Love+Hear), and contents through which humanity is felt.

An embodiment of the present disclosure can analyze expressions using emotion icons of various users, through a system for providing a user emotion activity based service, and can apply the analyzed result to a service.

FIG. 2 is a schematic conceptual view for describing a system for providing a user emotion activity based service according to an embodiment of the present disclosure.

Referring to FIG. 2, the system for providing a user emotion activity based service may include an electronic device 100, a service server 200, and a data processing device 300.

The electronic device 100 may correspond to a device capable of providing a service through a user and an interface. The term "user" used in various embodiments may refer to a person who uses the electronic device 100 or a device which uses the electronic device 100 (e.g., an artificial intelligence electronic device).

In accordance with an embodiment, the electronic device 100 may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (e.g. a Head-Mounted-Device (HMD) such as electronic glasses), electronic clothes, an electronic bracelet, an electronic necklace, an electronic appcessory, an electronic tattoo, and a smart watch.

In accordance with various embodiments, the electronic device 100 may correspond to a smart home appliance. The smart home appliance may include at least one of, for example, a television (TV), a Digital Versatile Disc (DVD) player, an audio, a refrigerator, an air conditioner, a vacuum cleaner, an oven, a microwave oven, a washing machine, an air cleaner, a set-top box, a TV box (e.g. Samsung HomeSync™, Apple TV™, or Google TV™), a game console, an electronic dictionary, an electronic key, a camcorder, and an electronic picture frame.

In accordance with various embodiments, the electronic device 100 may include at least one of various types of medical devices (e.g. Magnetic Resonance Angiography (MRA), Magnetic Resonance Imaging (MRI), Computed Tomography (CT), a scanning machine, an ultrasonic wave device, etc.), a navigation device, a Global Positioning System (GPS) receiver, an Event Data Recorder (EDR), a Flight Data Recorder (FDR), a car infotainment device, ship electronic equipment (e.g. navigation equipment for a ship, a gyro compass, etc.), avionics, a security device, and an industrial or home robot.

In accordance with various embodiments, the electronic device 100 may include at least one piece of furniture or a part of a building/structure, an electronic board, an electronic signature receiving device, a projector, or various measuring equipment (e.g., equipment for a water supply, an electricity, gases or radio measurement). The electronic device 100 according to various embodiments of the present disclosure may correspond to one of the aforementioned various devices or a combination thereof. Further, it is obvious to those skilled in the art that the electronic device 100 according to various embodiments of the present disclosure is not limited to the aforementioned devices.

The electronic device 100 can provide a service through a user and an interface, and can select, through the user and the interface, an emotion icon for a target which is to express an emotion thereof during use of the service. When the emotion icon is selected, information on the selected emotion icon may be transferred to the service server 200.

There may be one or more service servers 200. The one or more service servers 200 may provide a service to one or more electronic devices 100. In accordance with an embodiment, services may include a social network service, a contents service, etc., which can be provided through the electronic device. The one or more service servers 200 can provide, to the data processing device 300, the emotion icon log data of each of the one or more electronic device 100 during service provision.

The data processing device 300 can collect log data for an emotion icon activity of a user from each of the one or more service servers 200, and can analyze the emotion icon activity of the user by using the log data for the emotion icon activity of the user. The data processing device 200 can provide the analyzed result of the emotion icon activity of the user, to each of the one or more service servers 200. Each of the one or more service servers 200 can apply the analyzed result of the emotion icon activity of the user, to the services.

Figure 3:
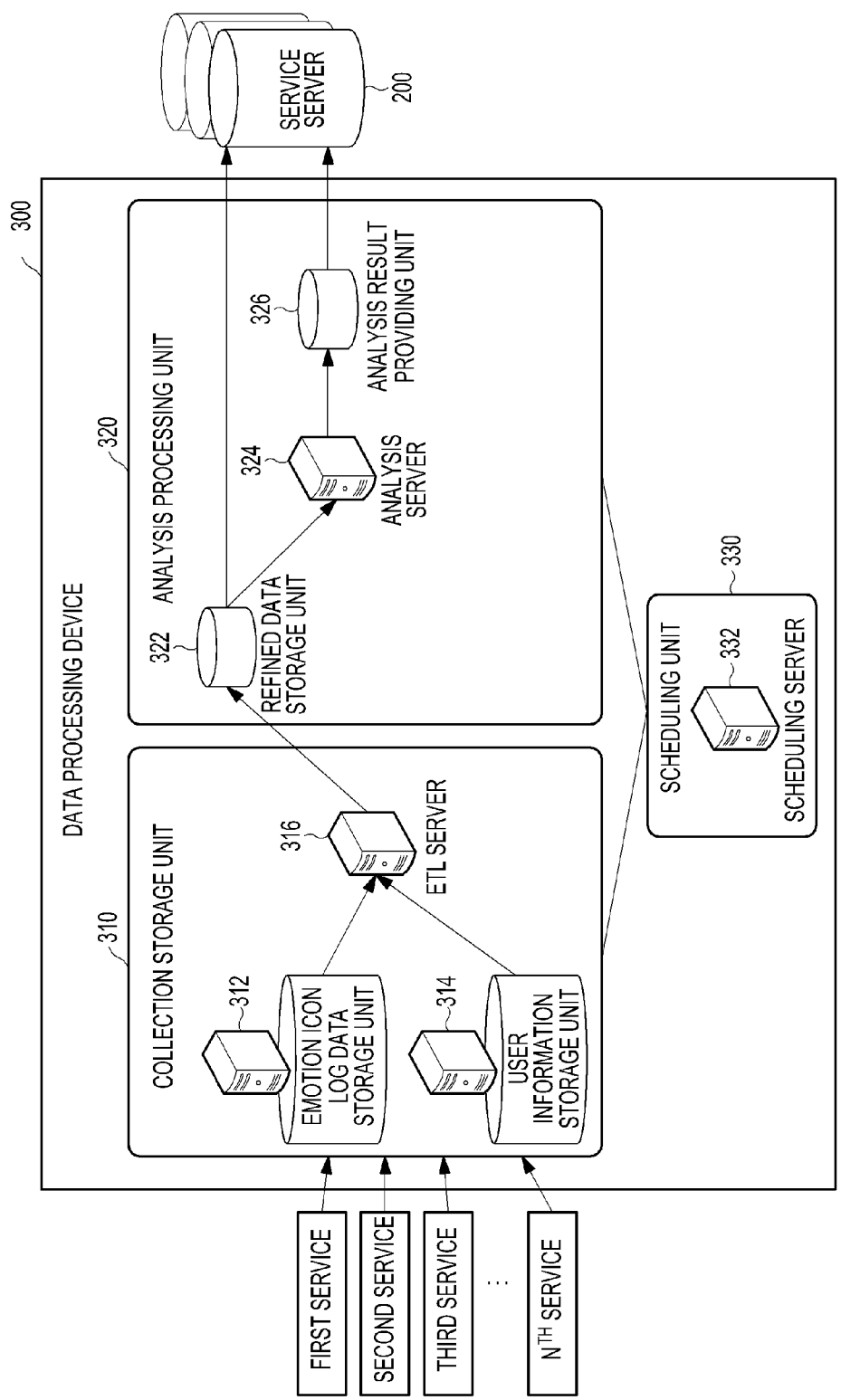
FIG. 3 illustrates a configuration of a data processing device according to an embodiment of the present disclosure.

FIG. 3 illustrates a configuration of a data processing device according to an embodiment of the present disclosure. Referring to FIG. 3, the data processing device 300 may include a collection storage unit 310, an analysis processing unit 320, and a scheduling unit 330.

The collection storage unit 310 can collect and store log data for an emotion icon activity of a user for one or more services. In accordance with an embodiment, the collection storage unit 310 may include an emotion icon log data storage unit 312, a user information storage unit 314, and an Extraction Transformation Load (ETL) server 316.

The emotion icon log data storage unit 312 can collect and store log data for an emotion icon activity of a user for one or more services, such as a first service to an $n^{th}$ service. In accordance with an embodiment, the emotion icon log data storage unit 312 may be a Hadoop Distributed File System (HDSF) or a Simple Storage Service (S3). The user information storage unit 314 can collect and store user information data (e.g., account information data) for the one or more services such as the first service to the $n^{th}$ service. The ETL server 316 can extract predetermined necessary data from the log data and the user information data for the emotion icon activity of the user, can apply a predetermined refinement rule (e.g. metadata) to acquire refined emotion icon log data, and can apply a predetermined conversion rule to the refined emotion icon log data to store the refined emotion icon log data in a refined data storage unit 322.

Meanwhile, the analysis processing unit 320 can analyze an emotion icon activity of a user by using the refined emotion icon log data, and can provide the analyzed result of the emotion icon activity of the user, to each of the one or more service servers 200. In accordance with an embodiment, the analysis processing unit 320 may include the refined data storage unit 322, an analysis server 324, and an analysis result providing unit 326.

The refined data storage unit 322 may store the emotion icon log data refined by the ETL server 316. In accordance with an embodiment, the emotion icon log data may include at least one of items of Product identification (PID), name, User identification (UID), Contents identification (CID), Service identification (SID), user_id, Image_id, post_on_id, emotion identification (FID), identification (ID), fid_count, timestamp, and buddy_list. The item "PID" may correspond to a product id which is an id indicating a product. The item "Name" may correspond to a name. The item "UID" may correspond to a unique ID which indicates a user ID or a device ID. The item "CID" may correspond to a contents ID which is an ID indicating contents. The item "SID" may correspond to a service ID which is an ID indicating a service. The item "user_id" may correspond to an ID which indicates a user. The item "Image_id" may correspond to an ID which indicates an image. The item "post_on_id" may correspond to an ID which indicates a posted content. The item "FID" may correspond to an emotion ID which indicates an emotion icon. The item "fid_count" may correspond to the number of times by which the emotion icon is used. The item "Timestamp" may correspond to an emotion icon use time period. The item "buddy_list" may correspond to a list of friends.

The analysis server 324 can perform various relationship analyses based on the emotion icon by using the emotion icon log data. In accordance with an embodiment, the analysis server 324 can perform at least one of an analysis of a relationship between users, an analysis of a relationship between a user and contents, an analysis of a relationship between a user and a service, an analysis of a relationship between a user and a location, and an analysis of an influential user, by using the emotion icon log data.

The analysis result providing unit 326 can store various analysis results based on the emotion icon, and can provide the various analysis results based on the emotion icon, to each of the one or more service servers 200. Each of the one or more service servers 200 can apply the various analysis results based on the emotion icon, to the services.

Meanwhile, a scheduling server 332 of the scheduling unit 330 can perform batch scheduling between the collection storage unit 310 and the analysis processing unit 320.

Figures 4, 5:
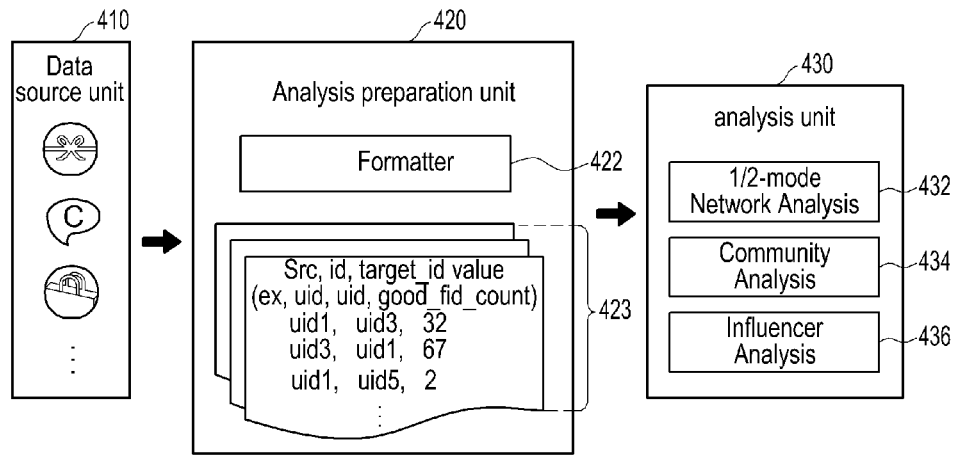
FIG. 4 is a view for describing various analysis operations of an analysis server according to an embodiment of the present disclosure.
FIG. 5 is a view for describing an analysis of a relationship between users in a first mode network analysis module according to an embodiment of the present disclosure.

FIG. 4 is a view for describing various analysis operations of an analysis server 324 according to an embodiment of the present disclosure.

Referring to FIG. 4, the analysis server 324 may include a data source unit 410, an analysis preparation unit 420, and an analysis unit 430.

The data source unit 410 may receive the refined emotion icon log data from the refined data storage unit 322 and may use the refined emotion icon log data as a data source.

The analysis preparation unit 420 can generate a data set 423 having one or more predetermined formats by using a predetermined formatter 422 based on the emotion icon log data serving as a data source. In accordance with an embodiment, the data set 423 may correspond to a data set including items of Scr_id, target_id, and value. The item "Scr_id" may correspond to an ID of a source-side which transfers an emotion icon. The item "target_id" may correspond to an ID of a target-side which receives an emotion icon. The item "value" may correspond to a value indicating an emotion icon and the number of times by which the emotion icon is received. In accordance with an embodiment, the entry "(uid1, uid3, good_fid_count)" may indicate the number of good icons which the uid1 transfers to the uid3. In accordance with some embodiments, the data set 423 may include at least one of items of PID, name, UID, CID, SID, user_id, Image_id, post_on_id, FID, ID, fid_count, timestamp, and buddy_list, in addition to Src_id, target_id, and value.

The analysis unit 430 may perform various relationship analyses based on the emotion icon by using the data set 423 prepared by the analysis preparation unit 420. In accordance with an embodiment, the analysis unit 430 may include first and second mode network analysis modules 432, a community analysis module 434, and an influence analysis module 436.

The first and second mode network analysis module 432 may perform an analysis of a relationship between users, an analysis of a relationship between a user and contents, or an analysis of a relationship between a user and a service, by using the data set 423. The community analysis module 434 may perform a community analysis. The influence analysis module 436 may perform an analysis of a targeted influential user in a community.

FIG. 5 is a view for describing an analysis of a relationship between users in the first mode network analysis module 432 according to an embodiment of the present disclosure.

Referring to FIG. 5, the first mode network analysis module 432 may analyze a relationship between users by calculating the number of times with respect to each emotion icon, by which each emotion icon is transferred/received between the users. For example, the first mode network analysis module 432 may calculate the number of times for each of the emotion icons of "Good", "Hate", "Surprise", "Sad", and "Envy", by which the users "John", "Thomas", and "Anna" transfer/receive the emotion icons of "Good", "Hate", "Surprise", "Sad", and "Envy", and may analyze the users who transfer/receive the largest number of each of the emotion icons of "Good", "Hate", "Surprise", "Sad", and "Envy", with respect to each of the emotion icons, based on the calculated result.

FIG. 6 is a view for describing an analysis of a relationship between users in the second mode network analysis module 432 according to an embodiment of the present disclosure.

Referring to FIG. 6, the second mode network analysis module 432 may analyze a relationship between a user and a service by calculating the number of times with respect to each emotion icon, by which the user uses the emotion icon during the service. For example, the second mode network analysis module 432 may calculate the number of times for each of the emotion icons of "Good", "Hate", "Surprise", "Sad", and "Envy", by which the users "John", "Thomas", and "Anna" use the emotion icons during a first service, a second service and a third service, and may analyze, based on the calculated result, a service during which the emotion icons of "Good", "Hate", "Surprise", "Sad", and "Envy" are most frequently used.

FIG. 7 is a view for describing an analysis of a community and a user influential in the community in a community analysis module 434 and an influence analysis module 436 according to an embodiment of the present disclosure.

Referring to FIG. 7, the community analysis module 434 may deduce a community 1 or 2 to which a user A, B, or C belongs. When the community 1 or 2 to which the user A, B, or C belongs uses an emotion icon f1 or f2 on contents Image1, Image2, or Image3, the influence analysis module 436 may deduce an influence factor 88, 93, or 12 indicating how much the user A, B, or C is influenced.

Figure 8:
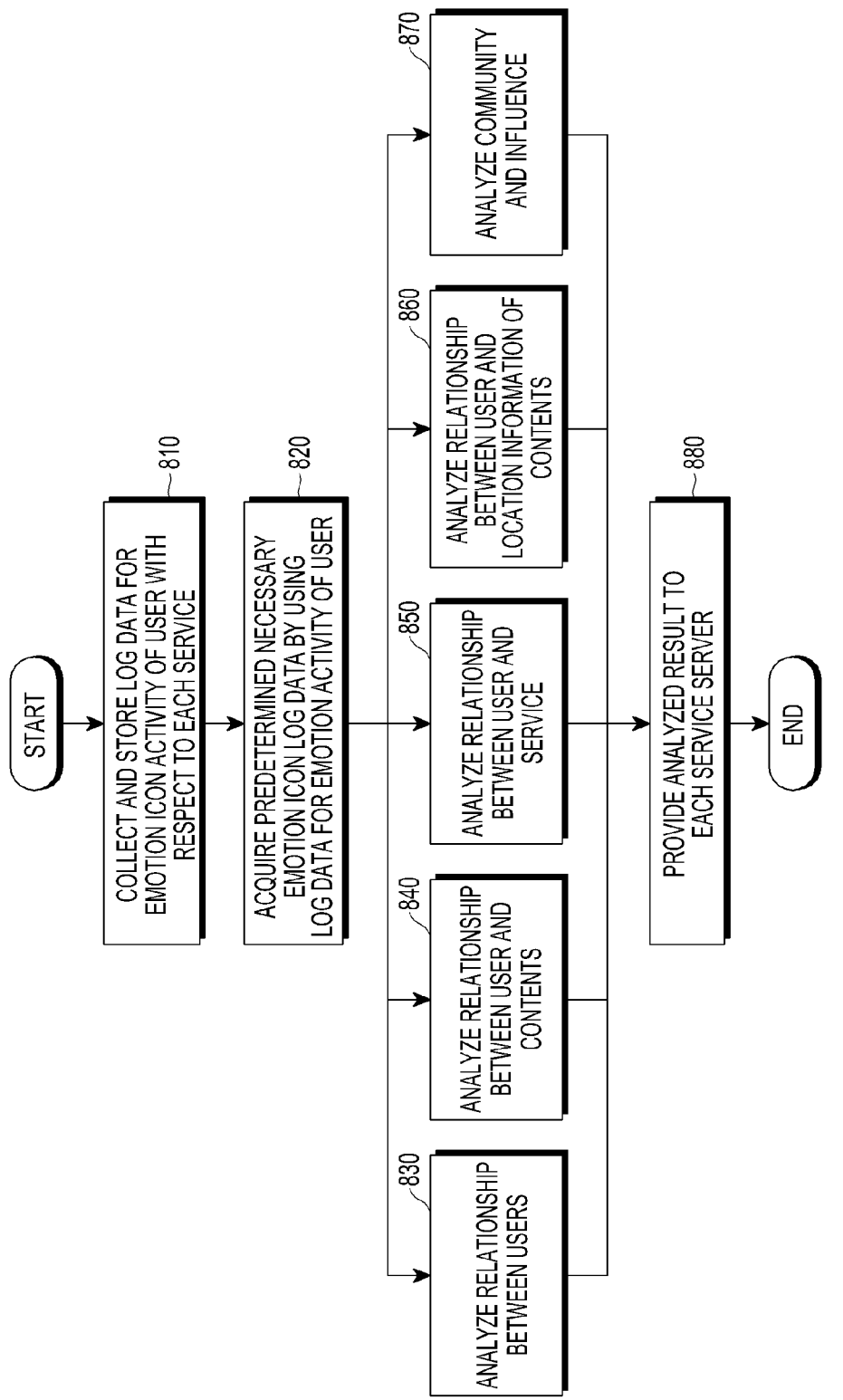
FIG. 8 is a flowchart illustrating an operation of processing data based on a user emotion activity according to an embodiment of the present disclosure.

FIG. 8 is a flowchart illustrating an operation of processing data based on a user emotion activity according to an embodiment of the present disclosure.

Referring to FIG. 8, the data processing device 300 may collect and store log data for an emotion icon activity of a user for each of the services, in operation 810. In accordance with an embodiment, the services may include a social network service, a contents service, etc., which can be provided through the electronic device. The data processing device 300 may receive the log data for the emotion icon activity of the user, from each of the one or more service servers 200, and may store the received log data.

In operation 820, the data processing device 300 may acquire predetermined necessary emotion icon log data, from the log data for the emotion icon activity of the user. In accordance with an embodiment, the data processing device 300 may extract predetermined necessary data from the log data for the emotion icon activity of the user, and may acquire refined emotion icon log data by applying a predetermined refinement rule (e.g., metadata). The data processing device 300 may perform various relationship analyses based on the emotion icon by using the emotion icon log data.

In operation 830, the data processing device 300 may analyze a relationship between users by using the emotion icon log data. In operation 840, the data processing device 300 may analyze a relationship between a user and contents by using the emotion icon log data. In operation 850, the data processing device 300 may analyze a relationship between a user and a service by using the emotion icon log data. In operation 860, the data processing device 300 may analyze a relationship between a user and a location of contents by using the emotion icon log data. In accordance with an embodiment, the data processing device 300 may analyze a relationship between a user and location information of contents by using information on a location where the user generated the contents. In operation 870, the data processing device 300 may analyze a community and an influence by using the emotion icon log data. In operation 880 the analyzed result is provided to each service server 200.

Figure 9:
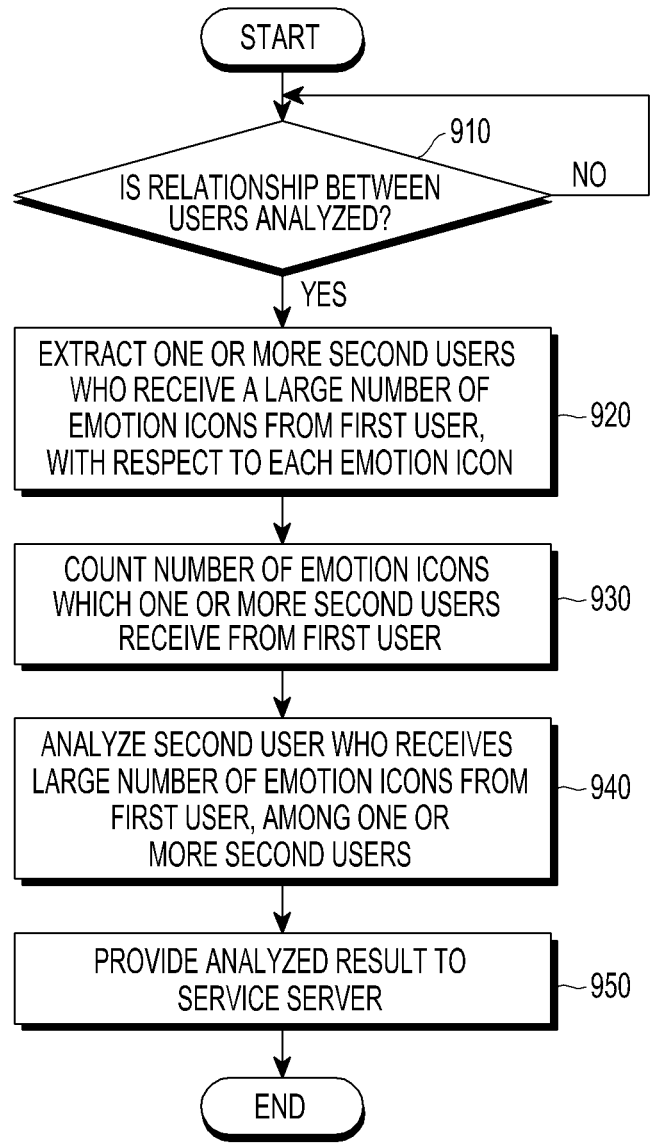
FIG. 9 is a flowchart illustrating an operation of analyzing a relationship between users by using emotion icon log data according to an embodiment of the present disclosure.

FIG. 9 is a flowchart illustrating an operation of analyzing a relationship between users by using emotion icon log data according to an embodiment of the present disclosure.

Referring to FIG. 9, in operation 910, the data processing device 300 may determine whether to analyze a relationship between users by using the emotion icon log data. When it is determined to analyze the relationship between users, the data processing device 300 may extract one or more second users with respect to each of emotion icons, who receive a large number of emotion icons from a first user, in operation 920.

In operation 930, the data processing device 300 may count the number of the emotion icons which each of the one or more second users receives from the first user.

In operation 940, the data processing device 300 may analyze which second user receives a large number of emotion icons from the first user, among the one or more second users.

In operation 950, the data processing device 300 may provide, to the one or more service servers 200, the analyzed result on which second user receives a large number of emotion icons from the first user, among the one or more second users. Accordingly, the one or more service servers 200 may apply, to a service, information on the second users who receives a large number of emotion icons from the first server, which is acquired based on the analyzed result. For example, the service server 200 may apply the analysis of the relationship between users, to a social network service by which a user can post contents and other users who are friends of the user can view the posted contents. In accordance with an embodiment, the service server 300 may recommend the one or more second users as emotion friends to each other by applying, to the service, the one or more second users who receive a large number of emotion icons from the first user.

Figure 10:
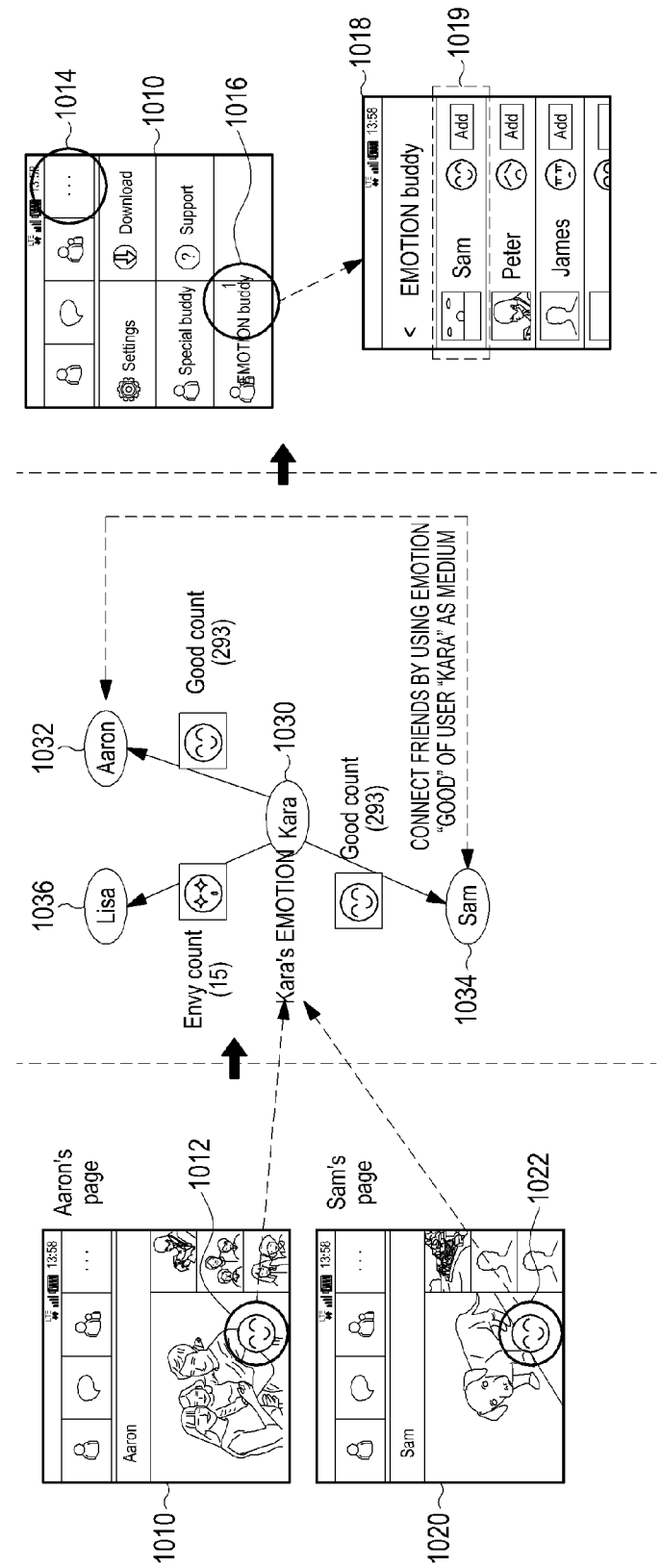
FIGS. 10A, 10B, and 10C illustrate examples of a service to which the analysis of the relationship between users is applied according to an embodiment of the present disclosure.

FIGS. 10A to 10C illustrate examples of a service to which the analysis of the relationship between users is applied according to an embodiment of the present disclosure.

Referring to FIG. 10A, the first user "Kara" 1030 can visit pages of the second user "Aaron" 1032 or the third user "Sam" 1034 who are friends thereof, by being connected to the service server 200 which provides the social network service through the electronic device 100. The first user "Kara" 1030 can visit the page 1010 of the second user "Aaron" through the electronic device 100 to use an emotion icon 1012, or can visit the page 1020 of the third user "Sam" through the electronic device 100 to use an emotion icon 1022. In accordance with such an emotion icon activity of the first user, the data processing device 300 may collect, from the service server 200, log data for the emotion icon activity of the first user "Kara" and may store the collected log data.

Referring to FIG. 10B, the data processing device 300 analyzes the log data for the emotion icon activity of the first user "Kara", so that the first user "Kara" can analyze other users who use the emotion icons (e.g., the second user "Aaron" 1032, the third user "Sam" 1034, the fourth user "Lisa" 1036, etc.), types of the emotion icons ("Good", "Envy", and the like) which are used by the other users, and the number of the emotion icons which are used by the other users (a "Good count", an "Envy count", etc.). In accordance with an embodiment, the data processing device 300 can analyze the second user "Aaron" 1032 and the third user "Sam" 1034 who correspond to users having received, from the first user "Kara" 1030, a large number of the same emotion icons ("Good"), and can notify the service server 200 of the second user "Aaron" 1032 and the third user "Sam" 1034 who correspond to users having received, from the first user "Kara" 1030, a large number of the same emotion icons ("Good"), according to the analyzed result. The service server 200 can apply, to the services, information on the second user "Aaron" 1032 and the third user "Sam" 1034 who correspond to users having received a large number of the same emotion icons ("Good"), from the first user "Kara" 1030.

Referring to FIG. 10C, the service server 200 can recommend the third user "Sam" 1034 as an emotion friend candidate 1016, through a menu of an emotion friend recommendation service 1014 of the page 1010 of the second user "Aaron" 1032, by using the information on the second user "Aaron" 1032 and the third user "Sam" 1034 who correspond to users having received a large number of the same emotion icons ("Good") from the first user "Kara" 1030. When the emotion friend candidate 1016 is selected, an emotion friend candidate screen 1018 may be configured to be displayed and to include the third user "Sam" 1034 as an emotion friend candidate 1019 among emotion friend candidates.

Figure 11:
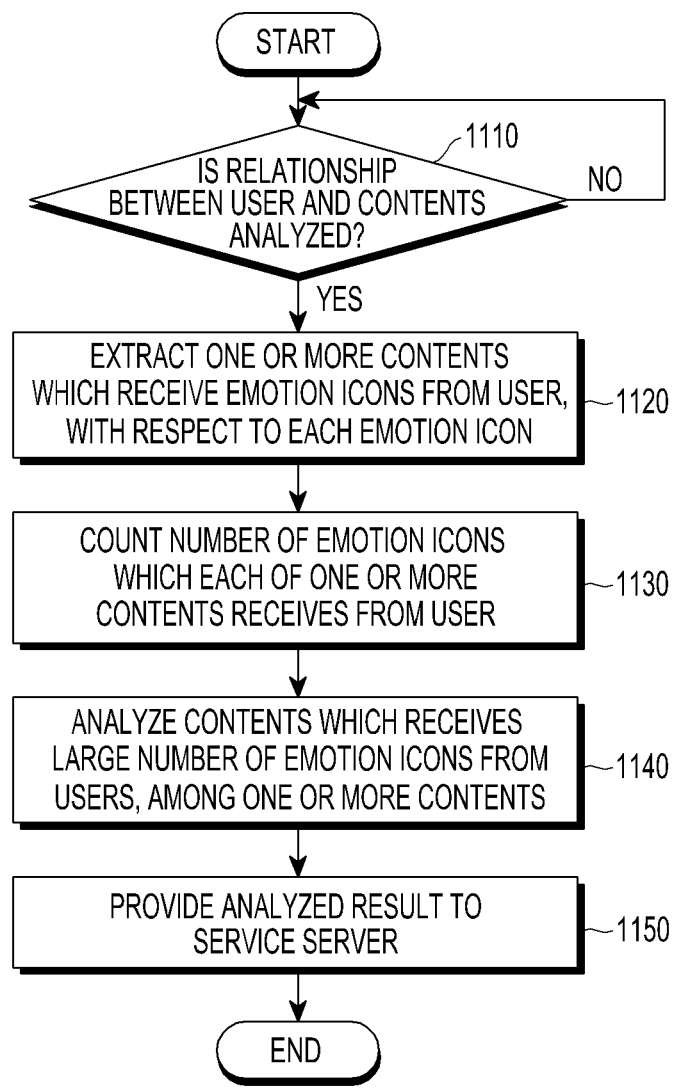
FIG. 11 is a flowchart illustrating an operation of analyzing a relationship between a user and contents by using emotion icon log data according to an embodiment of the present disclosure.

FIG. 11 is a flowchart illustrating an operation of analyzing a relationship between a user and contents by using emotion icon log data according to an embodiment of the present disclosure.

Referring to FIG. 11, in operation 1110, the data processing device 300 may determine whether to analyze a relationship between a user and contents by using the emotion icon log data.

When it is determined to analyze the relationship between a user and contents, the data processing device 300 can extract one or more pieces of contents with respect to each emotion icon, having received a large number of the emotion icons from users, in operation 1120.

In operation 1130, the data processing device 300 may count the number of the emotion icons which each of the one or more pieces of the contents receives from the users.

In operation 1140, the data processing device 300 may analyze contents which receive a large number of the emotion icons from the users, among the one or more pieces of the contents.

In operation 1150, the data processing device 300 may provide, to the one or more service servers 200, the result obtained by analyzing the contents which receives a large number of the emotion icons from the users, among the one or more pieces of the contents. Accordingly, the one or more service servers 200 may apply, to the services, information on the contents which receives a large number of the emotion icons from the users, based on the analyzed result. For example, the service server 200 may apply the analysis of the relationship between a user and contents, to the social network service by which a user can post contents and other users who are friends of the user can view the posted contents. In accordance with an embodiment, when the relationship between a user and contents is analyzed, the data processing device 300 can analyze contents which receives, from the first user, the same emotion icons of which the number is larger than a predetermined reference value, among one or more pieces of the contents, and the second user and the third user who correspond to users of each contents. In accordance with an embodiment, the service server 200 can recommend contents of the third user to the second user and can recommend contents of the second user to the third user, by using the second user and the third user who correspond to users of contents having received, from the first user, a large number of the same emotion icons.

Figure 12:
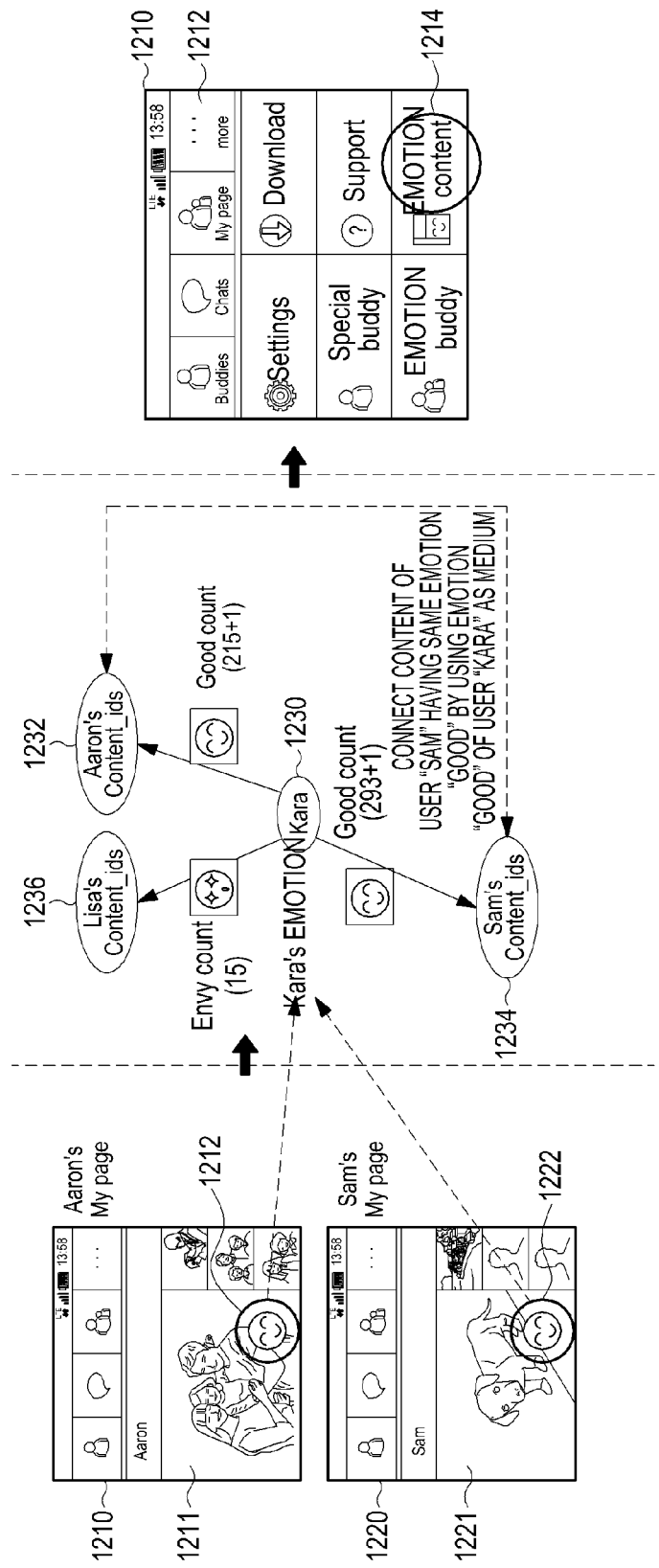
FIGS. 12A, 12B, and 12C illustrate examples of a service to which the analysis of the relationship between a user and contents is applied according to an embodiment of the present disclosure.

FIGS. 12A to 12C illustrate examples of a service to which the analysis of the relationship between a user and contents is applied according to an embodiment of the present disclosure.

Referring to FIG. 12A, the first user "Kara" 1230 can visit a page of the second user "Aaron" or the third user "Sam" who is a friend thereof, by being connected to the service server 200 which provides the social network service through the electronic device 100. The first user "Kara" 1230 can use an emotion icon 1212 on contents 1211 posted in a page 1210 of the second user "Aaron" and can use an emotion icon 1222 on contents 1221 posted in a page 1220 of the third user "Sam", through the electronic device 100. In accordance with such an emotion icon activity of the first user, the data processing device 300 can collect, from the service server 200, log data on the emotion icon activity of the first user, and can store the collected log data.

Referring to FIG. 12B, the data processing device 300 analyzes the log data for the emotion icon activity of the first user "Kara" 1230, so that the first user "Kara" 1230 can analyze contents to which the first user "Kara" 1230 uses an emotion icon (e.g., contents 1232 of the second user "Aaron", contents 1234 of the third user "Sam", contents 1236 of the fourth user "Lisa", etc.), types of the emotion icons ("Good", "Envy", and the like) which can be applied to each contents, and the number of the emotion icons which has been applied to each contents (a "Good count", an "Envy count", etc.). In accordance with an embodiment, the data processing device 300 can analyze contents 1232 of the second user "Aaron" and contents 1234 of the third user "Sam" 1232 which correspond to contents having received, from the first user "Kara" 1230, a large number of the same emotion icons ("Good"), and can notify the service server 200 of contents 1232 of the second user "Aaron" and contents 1232 of the third user "Sam" which correspond to contents having received, from the first user "Kara" 1234, a large number of the same emotion icons ("Good"), according to the analyzed result. The service server 200 can apply, to the services, information on contents 1232 of the second user "Aaron" and contents 1234 of the third user "Sam" which correspond to contents having received, from the first user "Kara" 1230, a large number of the same emotion icons ("Good").

Referring to FIG. 12C, the service server 200 can recommend the contents 1234 of the third user "Sam" as a recommended contents 1214, through a menu of a contents recommendation service 1212 of the page 1210 of the second user "Aaron", by using the information on the contents 1232 of the second user "Aaron" and the contents 1234 of the third user "Sam" 1232 which correspond to contents having received, from the first user "Kara" 1230, a large number of the same emotion icons ("Good").

Figure 13:
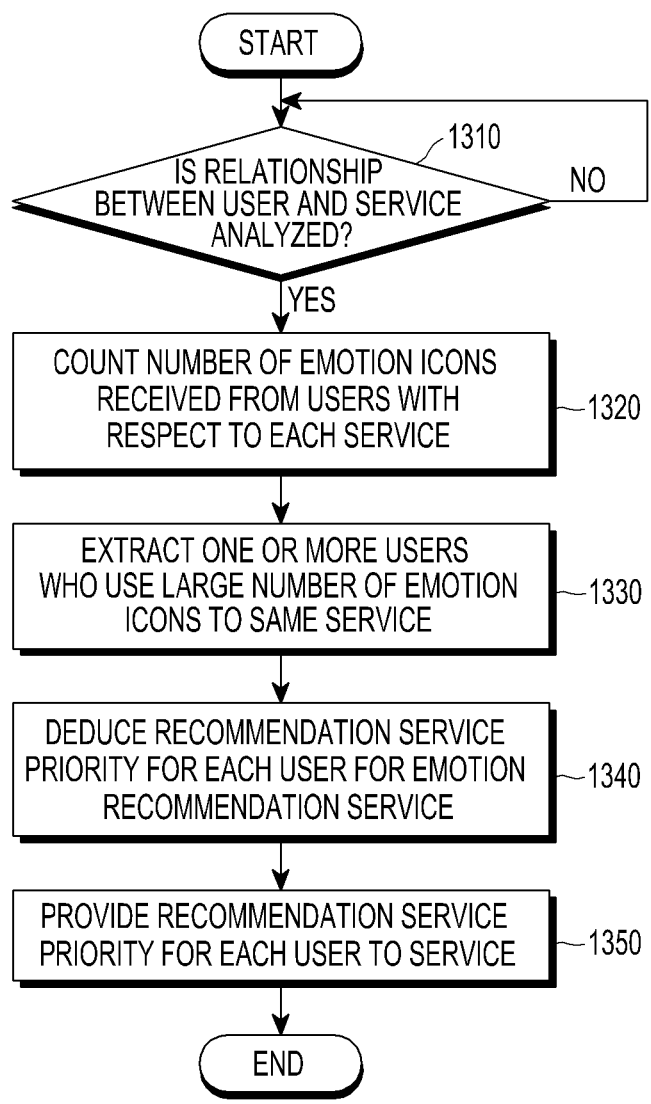
FIG. 13 is a flowchart illustrating an operation of analyzing a relationship between a user and a service by using emotion icon log data according to an embodiment of the present disclosure.

FIG. 13 is a flowchart illustrating an operation of analyzing a relationship between a user and a service by using log data for an emotion icon according to an embodiment of the present disclosure.

Referring to FIG. 13, in operation 1310, the data processing device 300 may determine whether to analyze a relationship between a user and a service by using the emotion icon log data. When it is determined to analyze the relationship between a user and a service, the data processing device 300 can count the number of emotion icons with respect to each service, which are received from users, in operation 1320. In operation 1330, the data processing device 300 can extract one or more users, each of whom uses a large number of the emotion icons to the same service. In operation 1340, the data processing device 300 can extract a recommendation service priority for each user for an emotion recommendation service. In operation 1350, the data processing device 300 can provide, to the service server 200, the recommendation service priority for each user. Accordingly, the one or more service servers 200 can apply, to the services, information on the recommendation service priority for each user.

FIGS. 14A to 14D illustrate examples of a service to which the analysis of the relationship between a user and a service is applied according to an embodiment of the present disclosure.

Referring to FIG. 14A, the data processing device 300 can calculate the numbers of times by which each of users "John", "Thomas", "Anna", "James" and "Peter" uses the emotion icons of "Good", "Hate", "Surprise", "Sad" and "Envy" to a first service, a second service and a third service.

Referring to FIG. 14B, the data processing device 300 can extract one or more users who use a larger number of emotion icons to the same service, by using the calculated number of times. For example, the data processing device 300 can extract the first user "John" 1410 and the second user "James" 1420 calculated as having used a large number of the emotion icon "Surprise" 1411 to the first service and the second service. The data processing device 300 can compare services to which the first user "John" 1410 and the second user "James" 1420 have used the emotion icon "Surprise" 1411. Although a large number of the emotion icons "Surprise" 1411 are used by the second user "James" 1420 as indicated by reference numeral 1422, the data processing device 300 can extract the third service to which the first user "John" 1410 does not use a large number of the emotion icons "Surprise" 1411 as indicated by reference numeral 1412.

Figures 14C, 14D:
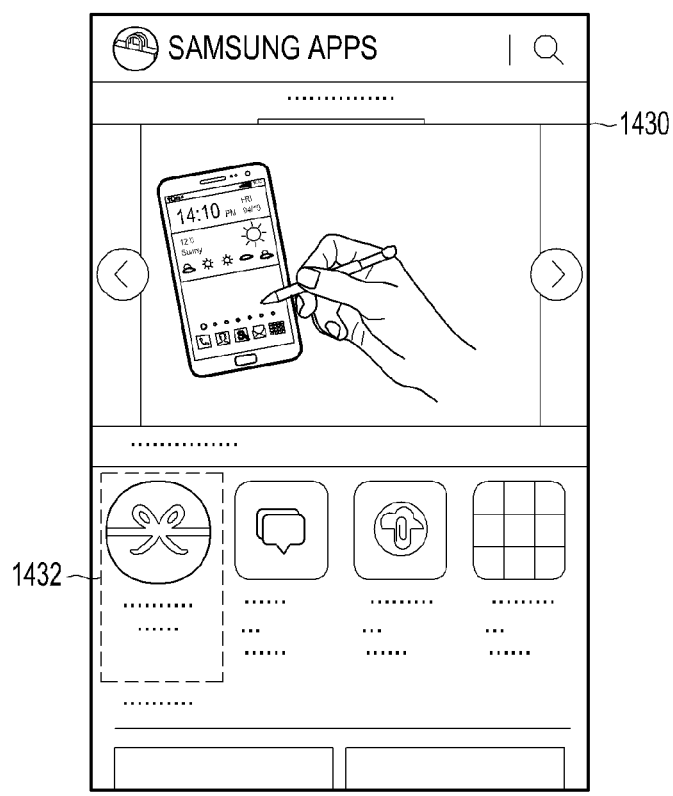

Referring to FIG. 14C, the data processing device 300 can determine the third service 1432 as a first rank Rank1 to be recommended to the first user "John" 1410. Further, the data processing device 300 can deduce a recommendation service priority for each of the users "Thomas", "Anna", "James" and "Peter" similarly. The service server 200 can receive the recommendation service priority for each of the users to apply the recommendation service priority to the services.

Referring to FIG. 14D, the service server 200 can display the recommended service 1432 of the first priority Rank1 to be recommended to the first user "John" 1410, on a service recommendation screen 1430 of the first user "John" 1410, through the electronic device 100. The first user "John" 1410 may then select and use the recommended service 1432.

Figure 15:
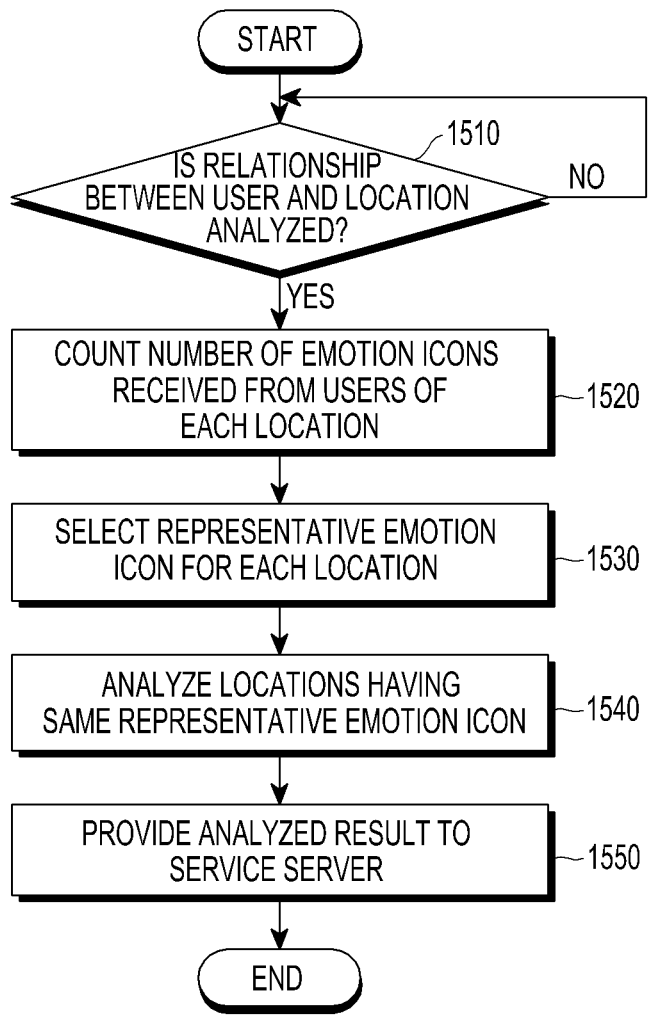
FIG. 15 is a flowchart illustrating an operation of analyzing a relationship between a user and a location by using emotion icon log data according to an embodiment of the present disclosure.

FIG. 15 is a flowchart illustrating an operation of analyzing a relationship between a user and a location by using emotion icon log data according to an embodiment of the present disclosure.

Referring to FIG. 15, in operation 1510, the data processing device 300 may determine whether to analyze the relationship between a user and a location by using the emotion icon log data. When it is determined to analyze the relationship between a user and location information of contents, the data processing device 300 can count the number of emotion icons with respect to each location, which are received from users, in operation 1520. In operation 1530, the data processing device 300 can select a representative emotion icon for each location. In operation 1540, the data processing device 300 can analyze locations having the same representative emotion icon. In operation 1550, the data processing device 300 can provide information on the locations having the same representative emotion icon, to the one or more service servers 200. Accordingly, the one or more service servers 200 can apply, to the services, information on the locations having the same representative emotion icon.

Figure 16:
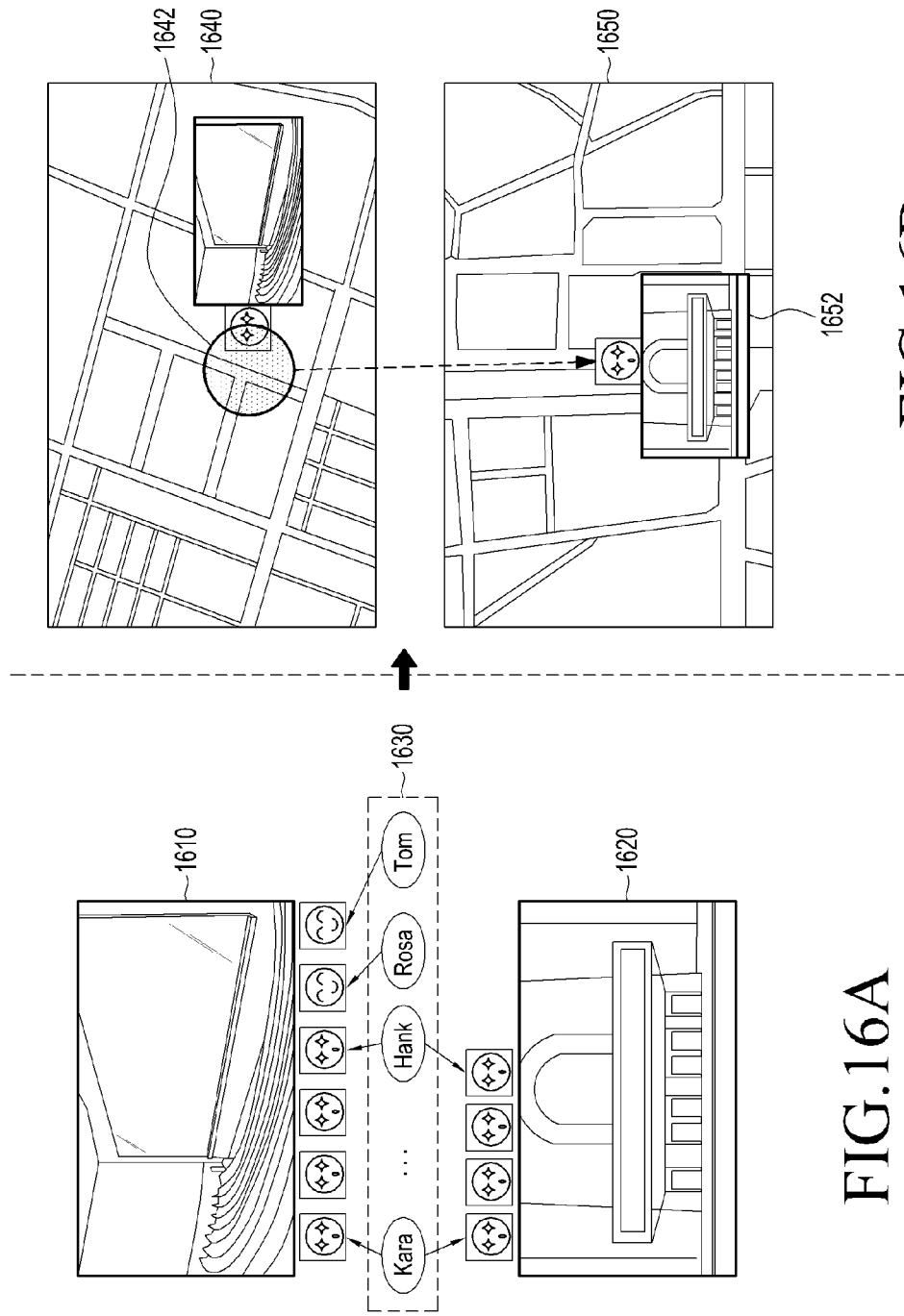
FIGS. 16A and 16B illustrate examples of a service to which the analysis of the relationship between a user and a location is applied according to an embodiment of the present disclosure.

FIGS. 16A and 16B illustrate examples of a service to which the analysis of the relationship between a user and a location is applied according to an embodiment of the present disclosure.

Referring to FIG. 16A, users may photograph a picture of an area where the users are located, through the electronic devices 100 thereof, and may post the photographed picture by being connected to the service server 200 which provides a social network service. The photographed picture may be posted with location information. For example, a first user may photograph a first picture 1610 of an area in a first location through a first electronic device and may post the first picture 1610, and a second user may photograph a second picture 1620 of an area in a second location through a second electronic device and may post the second picture 1620. Friends 1630 of the first user or the second user may apply the emotion icons to the first picture 1610 or the second picture 1620. The data processing device 300 can count the number of the emotion icons used for pictures in each area, and can choose the most frequently-used emotion icon as a representative emotion icon for each location. The data processing device 300 can analyze a location having a representative emotion icon equal to the representative emotion icon for each location, and can provide the analyzed result to the service server 200. The location information of the contents corresponding to the desired emotion icon as well as the representative emotion icon can be provided to services.

Referring to FIG. 16B, the service server 200 may provide a representative emotion icon 1642 of the area in the first location on a map 1640 together with the map 1640 through the electronic device 100, and when the representative emotion icon 1642 of the area in the first location is selected by a user, the service server 200 may provide a second picture 1650 of an area in the second location having a representative emotion icon 1652 equal to the representative emotion icon 1642 of the area in the first location.

Figure 17:
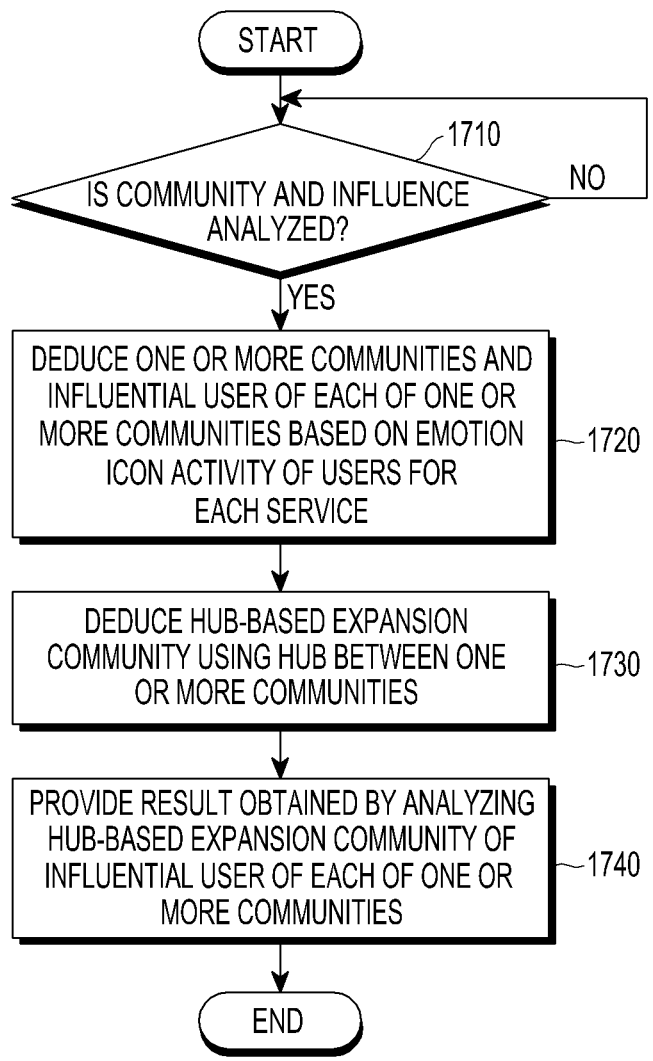
FIG. 17 is a flowchart illustrating an operation of analyzing a community and an influence by using emotion icon log data according to an embodiment of the present disclosure.

FIG. 17 is a flowchart illustrating an operation of analyzing a community and an influence by using emotion icon log data according to an embodiment of the present disclosure.

Referring to FIG. 17, in operation 1710, the data processing device 300 can determine whether to analyze a community and an influence by using the emotion icon log data. When it is determined to analyze the community and the influence, the data processing device 300 can deduce one or more communities and influential user for the one or more communities based on emotion icon activities of users for each service, in operation 1720.

In operation 1730, the data processing device 300 can deduce a hub-based expansion community by using a hub between the one or more communities.

In operation 1740, the data processing device 300 can provide, to the one or more service servers 200, the result obtained by analyzing the hub-based expansion community of the influential user of each of the one or more communities. Accordingly, the one or more service servers 200 can apply, to the services, information on the community and the influential user.

Figure 18A:
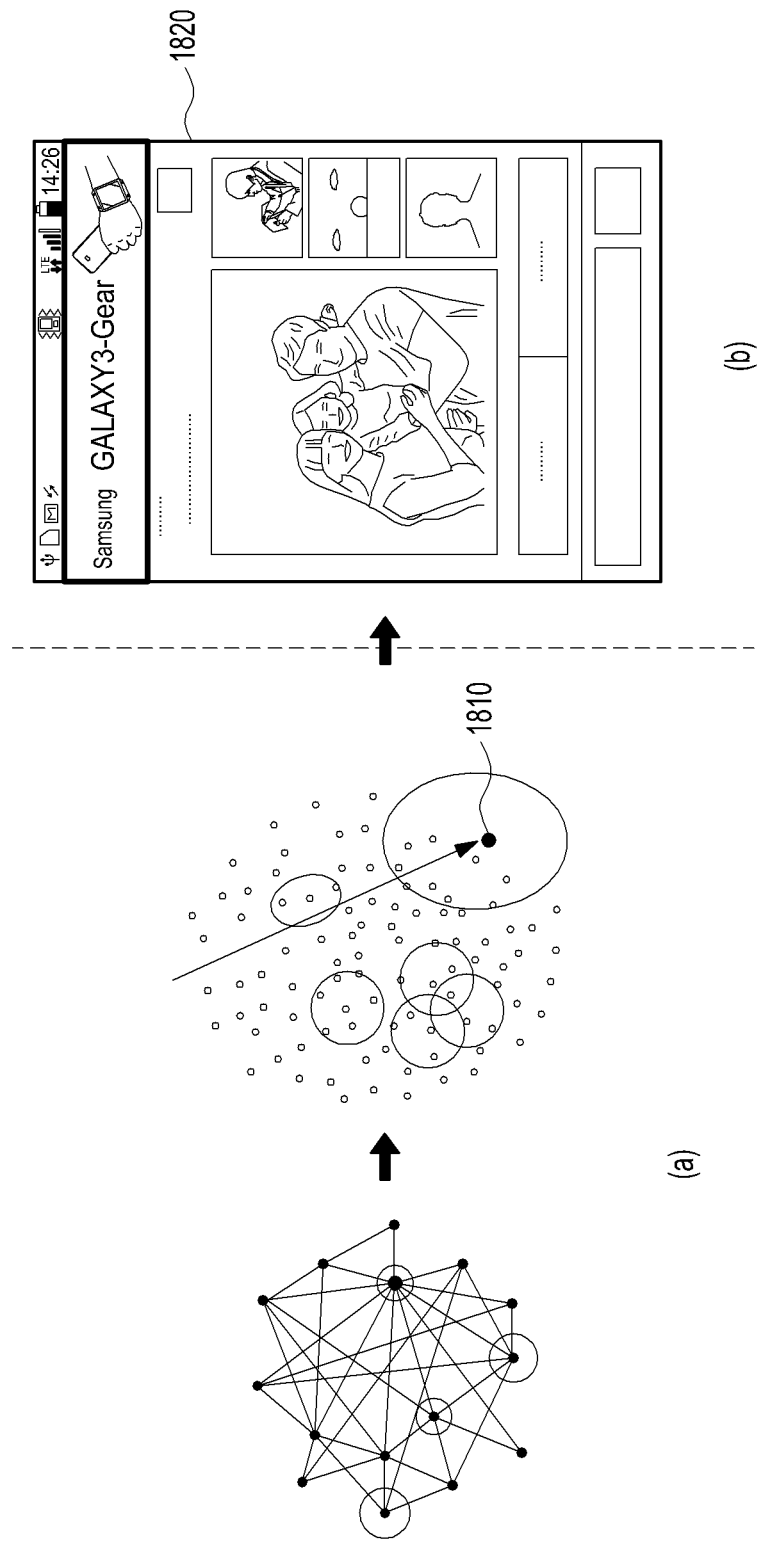
FIGS. 18A and 18B illustrate examples of a service to which the analysis of a community and an influence is applied according to an embodiment of the present disclosure.
Figure 18B:
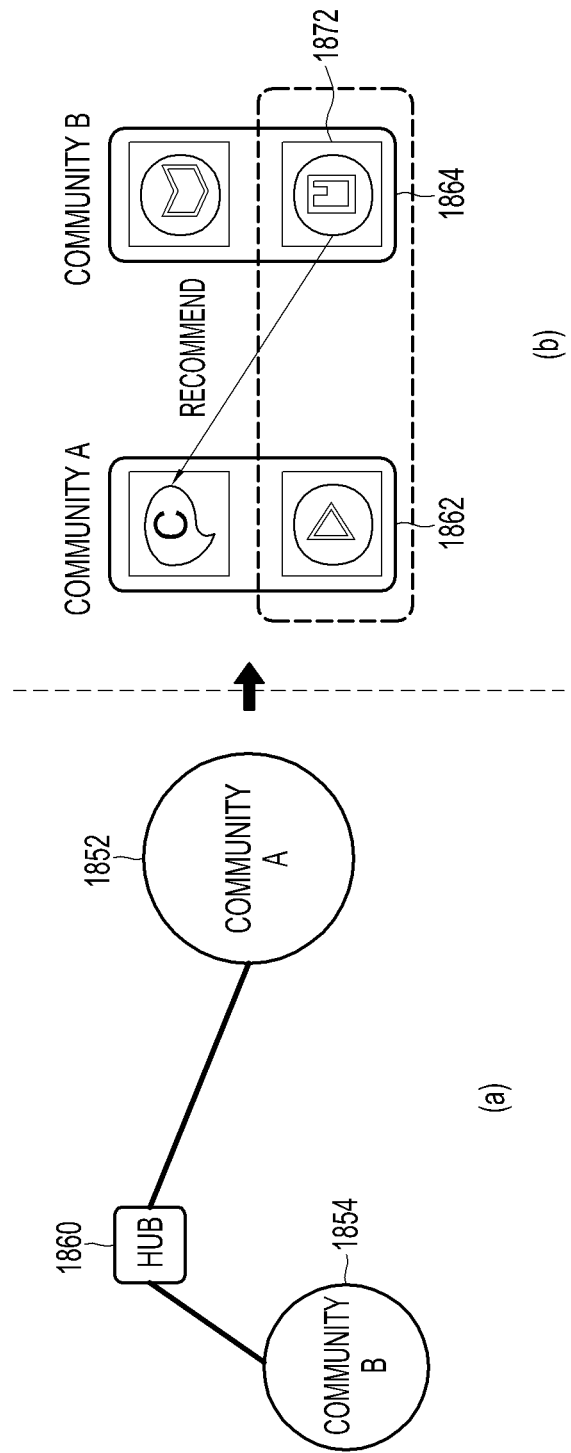

FIGS. 18A and 18B illustrate examples of a service to which the analysis of a community and an influence is applied according to an embodiment of the present disclosure.

Referring to FIG. 18A, the data processing device 300 can deduce one or more communities based on an emotion icon activity of a user for each service, using an information flow network analysis scheme. The data processing device 300 can deduce an influential user 1810 influential in each of the one or more communities. At this time, the influential user 1810 may correspond to a user receiving a large number of the emotion icons. The data processing device 300 can provide, to one or more service servers 200, information on a community and an influential user. The one or more service servers 200 can apply, to the services, information on the influential user. Since many users may visit a page 1820 of the influential user 1810 of the community, the one or more service servers 200 can provide advertisement information to the page 1820 of the influential user 1810 to improve efficiencies of exposure and clicks of the advertisement.

Referring to FIG. 18B, in operation, the data processing device 300 can deduce a hub 1860 between the one or more communities. For example, the data processing device 300 can deduce a hub 1860 between a community A 1852 and a community B 1854. In accordance with an embodiment, the hub 1860 may correspond to a user who uses a large number of the emotion icons to each of the community A 1852 and the community B 1854. The data processing device 300 can deduce an expansion community including the community A 1852 and the community B 1854 based on the hub 1860, using the hub 1860. The data processing device 300 can provide, to the one or more service servers 200, information on the expansion community including the community A 1852 and the community B 1854 based on the hub 1860. Accordingly, using the information on the expansion community, the one or more service servers 200 can recommend a service 1872 recommended by the community B 1864, to the community A 1862, and can recommend a service recommended by the community B 1864, to the community B 1864.

In accordance with various embodiments, the one or more service servers 200 can provide, through the electronic device 100, a service to which various analysis results based on emotion icon activities of users are applied.

Figure 19:
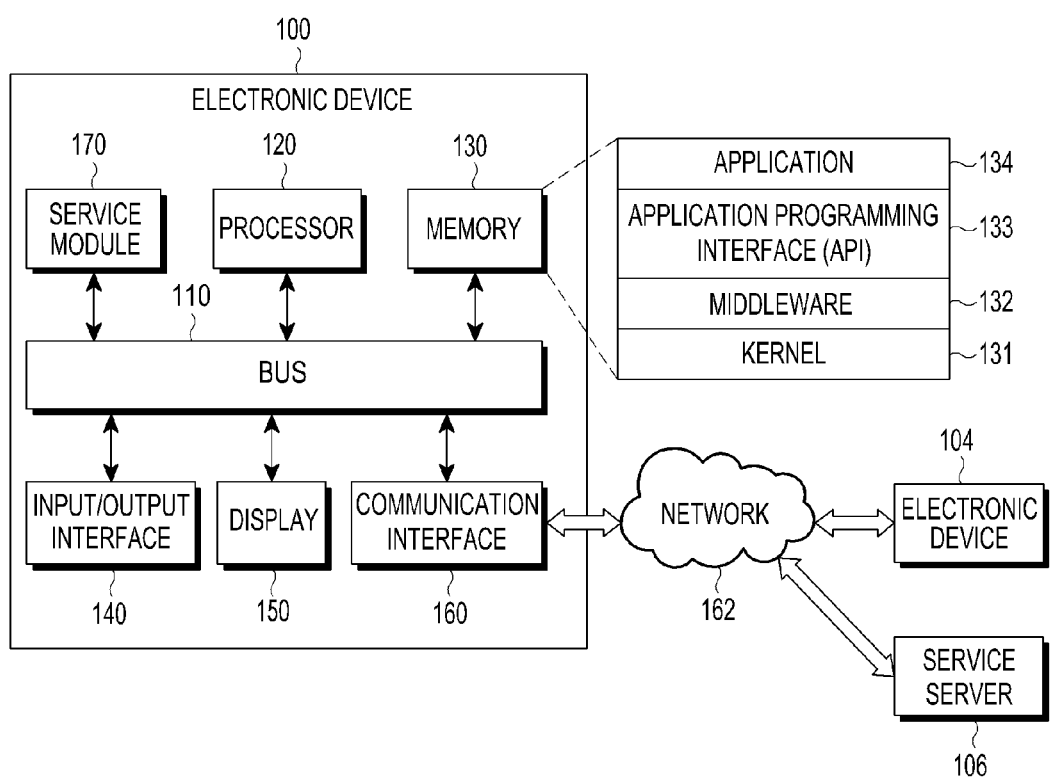
FIG. 19 illustrates a network environment including an electronic device according to various embodiments.

FIG. 19 illustrates a network environment including an electronic device 100 according to various embodiments of the present disclosure.

Referring to FIG. 19, the electronic device 100 may include a bus 110, a processor 120, a memory 130, an input/output interface 140, a display 150, a communication interface 160, and a service module 170.

The bus 110 may be a circuit connecting the above described components and transmitting communication (e.g. a control message) between the above described components.

The processor 120 may, for example, receive a command from other component elements (e.g., the memory 130, the input/output interface 140, the display 150, the communication interface 160, the service module 170, etc.), through the bus 110, may decrypt the received command, and may execute operation or data processing based on the decrypted command.

The memory 130 may store a command or data received from the processor 120 or other component elements (e.g., the input/output interface 140, the display 150, the communication interface 160, the broadcasting service module 170, etc.), or generated by the processor 120 or other component elements. The memory 130 may include programming modules, e.g., a kernel 131, a middleware 132, an Application Programming Interface (API) 133, an application 134, etc. Each of the programming modules described above may be configured by software, firmware, hardware, or a combination of two or more thereof.

The kernel 131 may control or manage system resources (e.g., the bus 110, the processor 120, the memory 130, etc.), used for executing an operation or a function implemented in other programming modules, e.g., the middleware 132, the API 133, or the application 134. Further, the kernel 131 may provide an interface that enables the middleware 132, the API 133, or the application 134 to access an individual component element of the electronic device 100 for control or management.

The middleware 132 may function as a relay so that the API 133 or the application 134 executes communication with the kernel 131, and may receive and transmit data. Further, in association with operation requests received from the application 134, the middleware 132 may execute a control (e.g., scheduling or load balancing) for an operation request, using of, for example, a method of assigning, to at least one of application 134, a priority for use of a system resource (e.g., the bus 110, the processor 120, the memory 130, etc.) of the electronic device 100.

The API 133 is an interface used by the application 134 to control a function provided from the kernel 131 or the middleware 132, and may include, for example, at least one interface or function (e.g. a command) for a file control, a window control, image processing, a character control, etc.

According to various embodiments, the application 134 may include a Short Message Service (SMS)/Multimedia Messaging Service (MMS) application, an email application, a calendar application, an alarm application, a health care application (e.g., an application for measuring a quantity of exercise, blood sugar, etc.), an environment information application (e.g., an application for providing information on atmospheric pressure, humidity, temperature, etc.), etc. The application 134 may correspond to an application related to an information exchange between the electronic device 100 and an external electronic device (e.g. an electronic device 104). The application related to the information exchange may include, for example, a notification transmission application for transferring predetermined information to an external electronic device or a device management application for managing an external electronic device. In accordance with an embodiment, the application may further include a social network service application, and a contents service application.

For example, the notification transmission application may include a function of transferring, to the external electronic device (e.g., the electronic device 104), notification information generated from other applications of the electronic device 100 (e.g. an SMS/MMS application, an e-mail application, a health management application, an environmental information application, etc.). Additionally or alternatively, the notification transmission application may, for example, receive notification information from an external electronic device (e.g. the electronic device 104) to provide the notification information to a user. The device management application may manage (e.g., install, delete, or update), for example, a function of at least a part of an external electronic device (e.g., the electronic device 104) that communicates with the electronic device 100 (e.g., turning on/off the external electronic device (or a few components thereof) or adjusting brightness (or resolution) of a display), an application operated in the external electronic device, or a service provided from the external electronic device (e.g., a call service or a message service).

In accordance with various embodiments, the application 134 may include an application designated according to properties (e.g., a type of the electronic device) of an external electronic device (e.g., the electronic device 104). For example, when the external electronic device 104 is an MP3 player, the application 134 may include an application related to reproduction of music. Similarly, when the external electronic device 104 is a mobile medical device, the application 134 may include an application related to health care. In accordance with an embodiment, the application 134 may include at least one of an application designated to the electronic device 100 and an application received from an external electronic device (e.g. a server 106 or the electronic device 104).

The input/output interface 140 may transfer a command or data input by a user through an input/output device (e.g., a sensor, a keyboard, or a touch screen), to the processor 120, the memory 130, the communication interface 160, and the broadcasting service module 170, for example, through the bus 110. For example, the input/output interface 140 may provide, to the processor 120, data with respect to a touch of a user input through a touch screen. Further, the input/output interface 140 may output, for example, a command or data received through the bus 110 from the processor 120, the memory 130, the communication interface 160, and the sensor module 170, through an input/output device (e.g., a speaker or display). For example, the input/output interface 140 may output voice data processed through the processor 120 to the user through the speaker.

The display 150 may display various pieces of information (e.g., multimedia data, text data, etc.) to a user.

The communication interface 160 may connect communication between the electronic device 100 and an electronic device (e.g., the electronic device 104 or the server 106). For example, the communication interface 160 may be connected to the network 162 through wireless communication or wired communication to communicate with an external device. The wireless communication may include at least one of, for example, WiFi, BLUETOOTH (BT), Near Field Communication (NFC), GPS and cellular communication (e.g. Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc.). The wired communication may include at least one of, for example, a Universal Serial Bus (USB), a High Definition Multimedia Interface (HDMI), a Recommended Standard 232 (RS-232), and a Plain Old Telephone Service (POTS).

In accordance with an embodiment, the network 162 may be a communication network. The communication network may include at least one of a computer network, the Internet, the Internet of things, and a telephone network. In accordance with an embodiment, a protocol (e.g. a transport layer protocol, a data link layer protocol, or a physical layer protocol) for the communication between the electronic device 100 and the external device may be supported by at least one of the application 134, the API 133, the middleware 132, the kernel 131, and the communication interface 160.

The service module 170 may process at part of information acquired from other components (e.g. the processor 120, the memory 130, the input/output interface 140, the communication interface 160, etc.) and may provide the processed part of the information to a user in various schemes. For example, the service module 170 may process and reproduce service data transferred from the communication interface 160, using the processor 120 or independently of the processor 120, to display video data on the display 150 or to output audio data through the input/output interface 140. In other words, the service module 170 may allow service data requested by a user to be received and may process the received service data, to output the requested service screen to the user.

Figure 20:
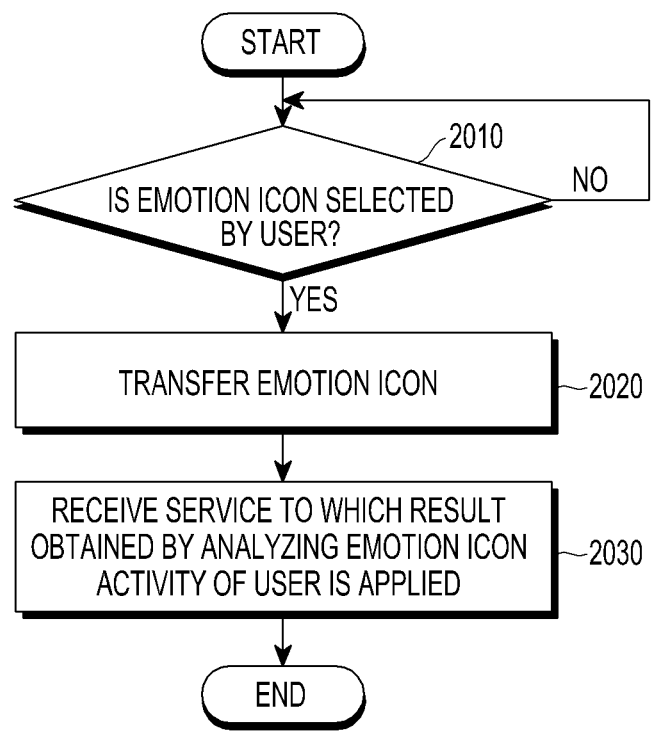
FIG. 20 is a flowchart illustrating an operation of an electronic device according to various embodiments of the present disclosure.

FIG. 20 is a flowchart illustrating an operation of an electronic device 100 according to various embodiments of the present disclosure.

Referring to FIG. 20, in operation 2010, the electronic device 100 may determine whether an emotion icon is selected by a user. When it is determined that the emotion icon is selected by the user, the electronic device 100 may transfer the emotion icon, in operation 2020. Log data for an emotion icon activity of a user is collected by the data processing device 300 according to transferring the emotion icon by the electronic device 100, so that the emotion icon activity of the user can be analyzed. The result obtained by analyzing the emotion icon activity of the user is transferred to the service server 200, so that the service server 200 can provide a service to which the result obtained by analyzing the emotion icon activity of the user is applied. In operation 2030, the electronic device 100 may receive the service to which the result obtained by analyzing the emotion icon activity of the user is applied, to provide the service to the user.

The described component elements of an electronic device according to various embodiments of the present disclosure may be formed of one or more components, and a name of a corresponding component element may be changed based on a type of electronic device. The electronic device according to the various embodiments of the present disclosure may include at least one of the aforementioned elements or may further include other additional elements, or some of the aforementioned elements may be omitted.

Also, a few of component elements of an electronic device according to various embodiments of the present disclosure are coupled to form a single entity, and may equivalently execute functions of the corresponding component elements which are not coupled.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Array (FPGA), and a programmable-logic device for performing operations which have been known or are to be developed hereafter.

According to various embodiments, at least part of a device (for example, modules or functions thereof) or a method (for example, operations) according to the various embodiments of the present disclosure may be embodied by, for example, an instruction stored in a computer readable storage medium provided in a form of a programming module. When the instructions are performed by at least one processor (e.g., the processor 120), the at least one processor may perform functions corresponding to the instructions. The computer readable storage media may be, for example, the memory 130. At least a part of the programming module may be implemented (for example, executed) by, for example, the processor 120. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a DVD, magneto-optical media such as a floptical disk, and hardware devices specially configured to store and perform a program instruction (for example, programming module), such as a Read Only Memory (ROM), a Random Access Memory (RAM), a flash memory and the like. Further, the program commands may include high class language codes that can be executed in a computer by using an interpreter, as well as machine language codes that are made by a compiler. The aforementioned hardware device may be configured to operate as one or more software modules in order to perform the operation of various embodiments of the present disclosure, and vice versa.

A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Also, a few operations may be executed based on a different order, may be omitted, or may additionally include another operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for providing a service, the apparatus comprising:
    at least one processor; and
    at least one memory storing one or more computer programs configured to be executed by the at least one processor, the one or more computer programs comprising instructions causing the at least one processor to:
        receive pieces of content from users of a plurality of locations, respectively,
        identify a representative emotion icon corresponding to each of the pieces of content based on counting a number of emotion icons with respect to each content of each location,
        provide, to an electronic device, a first representative emotion icon corresponding to first content of a first location so that the electronic device displays the first representative emotion icon and the first content,
        receive information on selection of the first representative emotion icon from the electronic device,
        identify second content of a second location corresponding to a second representative emotion icon which is identical to the selected first representative emotion icon from among a plurality of content of the plurality of locations, the first content being different from the second content, and
        provide, to the electronic device, the second content of the second location so that the electronic device displays the second content of the second location corresponding to the second representative emotion icon which is identical to the selected first representative emotion icon.

2. The apparatus of claim 1, wherein the instructions further cause the at least one processor to receive information of emotion icon log data analyzed by obtaining one or more second users who receive a threshold number of emotion icons from a first user among the users with respect to the one or more services from a data processing device.

3. The apparatus of claim 2, wherein the instructions further cause the at least one processor to recommend the one or more second users as emotion friends to each other.

4. The apparatus of claim 1,
    wherein the instructions further cause the at least one processor to:
        analyze emotion icon log data,
        obtain a second user and a third user related to content that received a first emoticon icon among a plurality of emoticon icons from a first user,
        obtain second content of the second user and third content of the third user, and
        provide information related to the second content of the second user and
    the third content of the third user, and
    wherein the first emoticon icon is sent by the first user most often.

5. The apparatus of claim 4, wherein the instructions further cause the at least one processor to recommend content of the third user to the second user and recommend content of the second user to the third user.

6. The apparatus of claim 4, wherein the analyzing of the emotion icon log data comprises:

counting a number of emotion icons, which are received from the users with respect to each service of the one or more services, and extracting one or more users who use a threshold number of the emotion icons to a same service to determine a recommendation service priority for each user.

7. The apparatus of claim 6, wherein the instructions further cause the at least one processor to recommend a service to each user according to the recommendation service priority for each user.

8. The apparatus of claim 4, wherein the analyzing of the emotion icon log data comprises determining one or more communities and one or more influential users influential in each of the one or more communities, based on the emotion icon log data of users for each service.

9. The apparatus of claim 8, wherein the instructions further cause the at least one processor to provide an advertisement to a service screen of the influential user.

10. The apparatus of claim 8, wherein the analyzing of the emotion icon log data further comprises, if the user uses a threshold number of the emotion icons to each of two of the one or more communities, determining a hub between the two of the one or more communities.

11. The apparatus of claim 10, wherein the analyzing of the emotion icon log data further comprises:
determining that the two communities comprise an expansion community, and
recommending a service of one of the two communities to the other of the two communities.

12. A service providing method, comprising:
receiving pieces of content from users of a plurality of locations, respectively;
identifying a representative emotion icon corresponding to each of the pieces of content based on counting a number of emotion icons with respect to each content of each location;
providing, to an electronic device, a first representative emotion icon corresponding to first content of a first location so that the electronic device displays the first representative emotion icon and the first content;
receiving information on selection of the first representative emotion icon from the electronic device;
identifying second content of a second location corresponding to a second representative emotion icon which is identical to the selected first representative emotion icon from among a plurality of content of the plurality of locations, the first content being different from the second content; and
providing, to the electronic device, the second content of the second location so that the electronic device displays the second content of the second location corresponding to the second representative emotion icon which is identical to the selected first representative emotion icon.

13. The method of claim 12, further comprising receiving information of analyzing of emotion icon log data by obtaining one or more second users having received a threshold number of emotion icons from a first user with respect to one or more services from a data processing device.

14. The method of claim 13, further comprising applying the one or more second users having received the threshold number of the emotion icons from the first user, to recommend the one or more second users as emotion friends to each other.

15. The method of claim 13, wherein the analyzing of the emotion icon log data comprises:

obtaining a second user and a third user related to contents that received a first emoticon icon among a plurality of emoticon icons from the first user;
obtaining second content of the second user and third content of the third user; and
providing information related to the second content of the second user and third content of the third user,
wherein the first emoticon icon is sent by the first user most often.

16. The method of claim 15, further comprising recommending content of the third user to the second user and recommending content of the second user to the third user.

17. The method of claimer 13, wherein the analyzing of the emotion icon log data comprises:
counting a number of emotion icons, which are received from users with respect to each service of the one or more services; and
extracting one or more users who use the threshold number of the emotion icons to a same service to deduce a recommendation service priority for each user.

18. The method of claim 17, further comprising recommending a service to each user according to the recommendation service priority for each user.

19. The method of claim 13, wherein the analyzing of the emotion icon log data comprises determining one or more communities and one or more influential users influential in each of the one or more communities, based on an emotion icon log data of users for each service.

20. The method of claim 19, further comprising providing an advertisement to a service screen of the influential user.

21. The method of claim 19, wherein the analyzing of the emotion icon log data further comprises, if a user uses the threshold number of the emotion icons to each of two of the one or more communities, determining a hub between the two of the one or more communities.

22. The method of claim 21, further comprising recommending a service of one of the two communities to the other of the two communities.

23. An electronic device comprising:
a display;
at least one processor; and
at least one memory storing one or more computer programs configured to be executed by the at least one processor, the one or more computer programs comprising instructions causing the at least one processor to:
obtain a first representative emotion icon corresponding to first content of a first location,
display the first representative emotion icon, the first content, and the first location on the display,
transmit, to a service apparatus, information on selection of the first representative emotion icon displayed on the display by a user input,
receive, from the service apparatus, second content of a second location corresponding to a second representative emotion icon which is identical to the selected first representative emotion icon from among pieces of content of a plurality of locations in response to the transmitted information, and
display, on the display, the second content of the second location corresponding to the second representative emotion icon which is identical to the selected first representative emotion icon.

24. A service providing method comprising:
obtaining a first representative emotion icon corresponding to first content of a first location;

displaying the first representative emotion icon, the first content, and the first location on a display;

transmitting, to a service apparatus, information on selection of the first representative emotion icon displayed on the display by a user input;

receiving, from the service apparatus, second content of a second location corresponding to a second representative emotion icon which is identical to the selected first representative emotion icon from among pieces of content of a plurality of locations in response to the transmitted information; and displaying, on the display, the second content of the second location corresponding to the second representative emotion icon which is identical to the selected first representative emotion icon.

25. A non-transitory computer readable recording medium storing instructions executable by at least one processor of an electronic device to cause the at least one processor to at least:

obtain a first representative emotion icon corresponding to first content of a first location;

display the first representative emotion icon, the first content, and the first location on a display;

transmit, to a service apparatus, information on selection of the first representative emotion icon displayed on the display by a user input receive, from the service apparatus, second content of a second location corresponding to a second representative emotion icon which is identical to the selected first representative emotion icon from among pieces of content of a plurality of locations in response to the transmitted information; and display, on the display, the second content of the second location corresponding to the second representative emotion icon which is identical to the selected first representative emotion icon.

* * * * *